(12) United States Patent
Takasaki et al.

(10) Patent No.: US 7,646,561 B2
(45) Date of Patent: Jan. 12, 2010

(54) METHOD OF WRITING PATTERN IN DISK, METHOD OF FOLLOWING TRACK ON DISK, AND APPARATUS FOR WRITING PATTERN IN DISK

(75) Inventors: Kohji Takasaki, Kanagawa (JP); Fuminori Sai, Kanagawa (JP); Kei Yasuna, Kanagawa (JP); Tomoyuki Oyama, Kanagawa (JP); Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 118 days.

(21) Appl. No.: 11/895,322

(22) Filed: Aug. 23, 2007

(65) Prior Publication Data

US 2008/0068741 A1 Mar. 20, 2008

(30) Foreign Application Priority Data

Aug. 23, 2006 (JP) .............................. 2006-227228

(51) Int. Cl.
*G11B 5/596* (2006.01)
(52) U.S. Cl. ..................................... 360/77.07; 360/75
(58) Field of Classification Search ........................ None
See application file for complete search history.

(56) References Cited

U.S. PATENT DOCUMENTS 5,612,833 A 3/1997 Yarmchuk et al.
6,061,200 A * 5/2000 Shepherd et al. ......... 360/77.04
6,563,663 B1 5/2003 Bi et al.
6,977,792 B1 * 12/2005 Melrose et al. ............... 360/75
7,149,048 B1 * 12/2006 Ray et al. ................. 360/77.04
7,167,336 B1 * 1/2007 Ehrlich et al. ............ 360/77.04
7,423,834 B1 * 9/2008 Sun et al. ................. 360/77.04
2004/0264031 A1 12/2004 Yatsu
2005/0094307 A1 5/2005 Iwashiro

FOREIGN PATENT DOCUMENTS

JP 08-212733 8/1996
JP 09-035225 2/1997

* cited by examiner

*Primary Examiner*—Jason C Olson
(74) *Attorney, Agent, or Firm*—Townsend and Townsend and Crew LLP; Patrick Duncan

(57) ABSTRACT

Embodiments of the present invention efficiently perform servo correction for prevention of propagation of a position error in a radial direction in self servo write (SSW). According to one embodiment, in SSW, a target position of a reference track TO in writing a servo write track TN is corrected. The target position is represented as a target value of a position signal calculated from a signal read by a read element. A signal indicating a deviation (a position error) from the target position (the target value) is referred to as PES. The SSW in this example performs correction of target positions in respective tracks using an impulse response of a servo system. Consequently, it is possible to efficiently and effectively prevent the propagation of position error in the SSW.

16 Claims, 15 Drawing Sheets

METHOD OF WRITING PATTERN IN DISK, METHOD OF FOLLOWING TRACK ON DISK, AND APPARATUS FOR WRITING PATTERN IN DISK

CROSS-REFERENCES TO RELATED APPLICATIONS

The instant nonprovisional patent application claims priority to Japanese Patent Application No. 2006-227228 filed Aug. 23, 2006 and which is incorporated by reference in its entirety herein for all purposes.

BACKGROUND OF THE INVENTION

Disk drive devices, or devices that use disks of various forms, including an optical disk, a magneto-optical disk, or a flexible disk, are known. Among the devices, a hard disk drive (HDD) is one of storage devices that are widespread as storage devices for computers and indispensable in the present computer systems. Moreover, because of its excellent characteristics, uses of the HDD are not limited to computer systems but are increasingly expanding to moving image recording and playing apparatuses, car navigation systems, cellular phones, removable memories used in digital cameras, and the like.

A magnetic disk used in the HDD has plural tracks formed in a concentric shape. Servo data and user data are stored in the respective tracks. A head element unit formed of a thin film element may perform data writing or data readout by accessing a predetermined area (address) in accordance with the servo data. In data readout processing, a signal read out from the magnetic disk by the head element unit is subjected to predetermined signal processing such as waveform shaping and decode processing by a signal processing circuit and transmitted to a host. Transfer data from the host is written in the magnetic disk after being subjected to the predetermined processing by the signal processing circuit in the same manner.

As described above, the respective tracks include user data areas in which the user data is stored and servo pattern areas in which the servo data is stored. Servo patterns are composed of cylinder IDs, sector numbers, burst patterns, and the like. The cylinder IDs indicate addresses of the tracks and the sector numbers indicate sector addresses in the tracks. The burst patterns have relative position information of a magnetic head with respect to the tracks.

The servo patterns are formed in plural sectors spaced apart in a circumferential direction in the respective tracks. The servo patterns of the respective sectors over all the tracks are aligned in positions (phases) in the circumferential direction. Readout of data from or writing of data in the magnetic disk is executed while a position of the magnetic head is checked according to the servo data in a state in which the magnetic disk is rotating.

The servo patterns are written in the magnetic disk in a factory before the HDD as a product is shipped. Conventional typical writing of servo patterns is performed using a servo writer as an external apparatus. The HDD with a top cover thereof removed is set in the servo writer. The servo writer positions a head in the HDD with a positioner (an external positioning mechanism). A servo pattern generating circuit writes generated servo patterns in the magnetic disk.

At present, a writing process of servo data occupies a main position in manufacturing cost of the HDD. In particular, in recent years, there is a keen competition for an increase in capacity of the HDD and, therefore, a TPI (Track Per Inch) is rapidly increasing. According to the increase in the TPI, the number of tracks increases and a track width decreases. This causes an increase in STW time and improvement of precision of the servo writer and ultimately raises the cost of the STW. In order to reduce this cost, a reduction in the cost of the servo writer, a reduction in the STW time, and the like are in progress.

For example, SSW (Self Servo Write) uses only a mechanical system of HDD itself for servo write, controls a spindle motor and a voice coil motor in an HDD from an external circuit, and writes servo patterns using the external circuit. Consequently, a reduction in cost of the servo writer is realized.

A conventional SSW method includes making use of the fact that radial direction positions of a read element and a write element of a head element unit are different (this is called read write offset), the read element performs positioning while reading out a servo pattern already written on an inner radial side or an outer radial side and the write element writes a new servo pattern in a desired track apart from the servo pattern by the read write offset.

In this way, in self propagation of the servo pattern for writing the new track, it is expected that, basically, accuracy in the radial direction of the servo pattern read is directly inherited by the servo pattern written anew. However, because of various factors that cause errors, this accuracy is deteriorated by the propagation. The deterioration in the positioning accuracy causes a deviation from an desired position of a burst pattern. This deviation is inherited at the next propagation. This process also depends on characteristics of a servo loop for causing the head element unit to follow a track. In this way, the deterioration in the accuracy is caused by a complicated mechanism involving the various factors.

In order to prevent this deterioration in the accuracy of the track follow due to the propagation, in the SSW, the following method is proposed in Japanese Patent Publication No. 08-212733 ("Patent Document 1"). For example, a case in which a track T0 is now followed and a new track TN is about to be written is considered. A position error signal (PES) of the track follow at the time when the track T0 is written is stored in advance. This PES is subjected to the Fourier transform and thus obtained Fourier components of PES is multiplied by a reference correction coefficient.

This correction coefficient is prepared for components with large gains (the components are usually limited to only several components with small frequencies) among frequency components of a closed loop response of a positioning servo of the head element unit. Subsequently, the components are subjected to the inverse Fourier transform to correct target values in the respective sectors at the time when the track TN is followed. Consequently, a propagation error in the radial direction is controlled.

The correction method disclosed in the Patent Document 1 includes, in the correction of the target values in the respective sectors, (1) discrete Fourier transform for the PES, (2) control of the components with large gains of the Fourier transform by multiplication of the coefficient, (3) calculation of a correction value by the discrete inverse Fourier transform, and (4) acquisition of a new target position by addition of the correction value to a target reference position. It is necessary to execute this correction processing for the respective sectors when the respective tracks are written. However, extremely large arithmetic operation power is required to repeat the Fourier transform and the inverse Fourier transform for the respective sectors. Therefore, in order to correct the target values of the respective sectors, a method different from the above method is desired.

BRIEF SUMMARY OF THE INVENTION

Embodiments of the present invention efficiently perform servo correction for prevention of propagation of a position error in a radial direction in self servo write (SSW). According to the particular embodiment disclosed in FIG. 2, in SSW a target position of a reference track TO in writing a servo write track TN is corrected. The target position is represented as a target value of a position signal calculated from a signal read by a read element 121. A signal indicating a deviation (a position error) from the target position (the target value) is referred to as PES. The SSW in this example performs correction of target positions in respective tracks using an impulse response of a servo system. Consequently, it is possible to efficiently and effectively prevent the propagation of position error in the SSW.

DETAILED DESCRIPTION OF THE INVENTION

Figure 1:
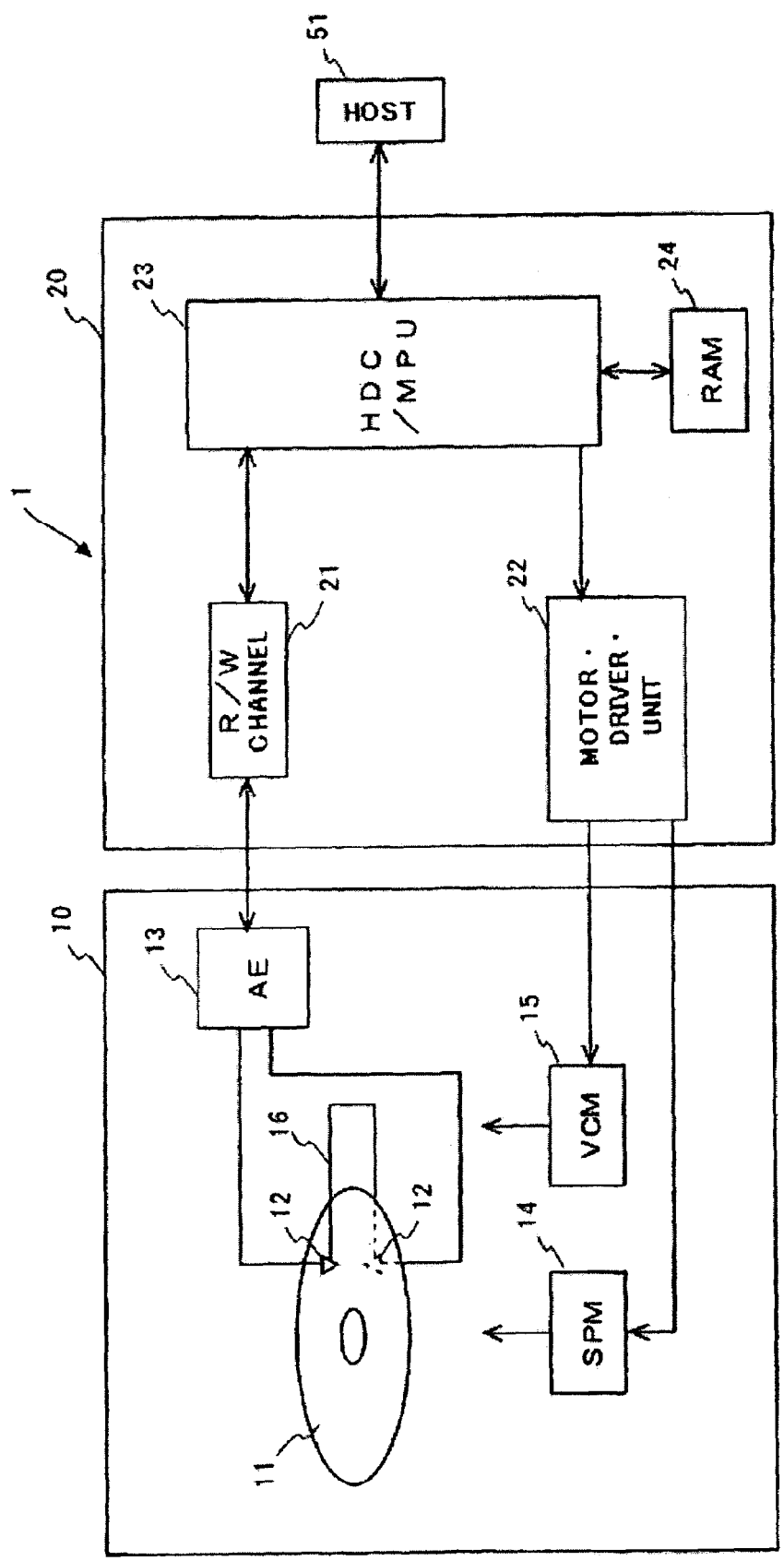
FIG. 1 is a block diagram showing a structure of an HDD according to an embodiment of the invention.

Embodiments in accordance with the present invention relate to a method of writing a pattern in a rotating disk, a method of following a track on a disk, and an apparatus for writing a pattern in a disk. More particularly, embodiments of the present invention relate to correction of a target value in a track following servo control.

An aspect of the invention is a method of writing tracks including patterns of plural sectors on a rotating disk using a head having a read element and a write element in different radial direction positions. In this method, target values of the respective sectors are corrected by calculating corrected target values using position error signal values corresponding to the respective sectors included in the tracks followed by the read element and a correction operator determined in accordance with an impulse response of a servo system that performs positioning control for the read element. Moreover, in a state in which the head is positioned to bring position signal values of the respective sectors read by the read element closer to the corrected target values of the sectors, a new track is written by the write element. It is possible to efficiently calculate the corrected target values by using the impulse response of the servo system.

In an example, the position error signal values corresponding to the respective sectors are position error signal values measured by reading out the respective sectors with the read element. Consequently, it is possible to calculate more accurate correction values.

In an example, the position error signal values at the writing of the respective sectors are used as position error signal values corresponding to the respective sectors. Consequently, it is possible to efficiently calculate correction values.

The correction operator is derived from an inverse matrix of a matrix for specifying a relation between deviations from ideal positions of respective sectors included in one track and position error signal values in a state in which the track is followed. The matrix in this case is represented as follows.

$$\begin{bmatrix} 1 & e\_N-1 & e\_N-2 & & e\_2 & e\_1 \\ e\_1 & 1 & e\_N-1 & & e\_3 & e\_2 \\ e\_2 & e\_1 & 1 & & e\_4 & e\_3 \\ & & & & & \\ e\_N-3 & e\_N-4 & e\_N-5 & & e\_N-1 & e\_N-2 \\ e\_N-2 & e\_N-3 & e\_N-4 & & 1 & e\_N-1 \\ e\_N-1 & e\_N-2 & e\_N-3 & & e\_1 & 1 \end{bmatrix}$$

N is the number of sectors read by the read element and e_k is a position error value at sector k in the case in which impulse is inputted to sector 0.

The correction operator may be calculated considering that the impulse response of the servo system is 0 when the impulse response exceeds the number of sectors set in advance. Consequently, it is possible to make the calculation efficient without losing effectiveness of processing.

Preferably, correction operators corresponding to the respective sectors are comprised of elements in a number equal to or smaller than the number of all sectors read by the read element while the disk makes one rotation. A correction value of the target value of each of the sectors is calculated using a multiply-and-sum operation of a position error value corresponding to each of continuous sectors including the sector and sectors before and after the sector to be corrected and the respective elements of the correction operator. Consequently, it is possible to make the calculation efficient without losing effectiveness of the processing.

Preferably, the calculation of the corrected target values with the track written anew as a reference and the writing of a new track are repeated to advance writing of patterns on the rotating disk and, in the course of advancing writing the patterns, the impulse response of the servo system is specified by measurement to perform update of the correction operator. Consequently, it is possible to prevent error propagation and error amplification in the processing for advancing writing of the patterns.

Another aspect of the invention is a method of reading out patterns of plural sectors written on a rotating disk with a read element and performing track following of the read element with a servo system. In this method, initially set target values of the respective sectors are corrected by calculating corrected target values using position error signal values corresponding to the respective sectors included in the tracks followed by the read element and a correction operator determined in accordance with an impulse response of the servo system. Moreover, the read element is subjected to positioning control to bring position signal values of the respective sectors read by the read element closer to the corrected target values of the respective sectors. Consequently, it is possible to position the read element in a desired position. The correction operator is derived from an inverse matrix of a matrix for specifying a relation between deviations from ideal positions of respective sectors included in one track and position error signal values in a state in which the read head is following the track.

In an example, position error signal values of the respective sectors are measured by the read element and the position error signal values measured of the respective sectors are used as position error signal values corresponding to the respective sectors. In another example, position error signal values at the writing of the respective sectors are used as position error signal values corresponding to the respective sectors.

Correction operators corresponding to the respective sectors may be comprised of elements in a number equal to or smaller than the number of all sectors read by the read element in one revolution of the disk. Correction values of the target values of the respective sectors are calculated using a multiply-and-sum operation of a position error value corresponding to each of continuous sectors including the sector to be corrected and sectors before and after the sector and the respective elements of the correction operator.

Still another aspect in accordance with embodiments of the invention is an apparatus that writes tracks including patterns of plural sectors in a rotating disk. This apparatus includes a head having a read element and a write element in different positions in a radial direction of the disk and a controller that subjects the head to positioning control. The read element reads respective sectors included in a track to be followed. The controller corrects target values of the respective sectors using position error signal values corresponding to the respective sectors included in the tracks followed by the read element and a correction operator determined in accordance with an impulse response of a servo system that performs positioning control for the read element and calculates corrected target values. In a state in which the head is positioned to bring position signal values of the respective sectors read by the read element closer to the corrected target values of the sectors, the write element writes a new track. It is possible to efficiently calculate the corrected target values by using the impulse response of the servo system.

According to embodiments of the invention, in the case in which patterns written in a disk are read by a head and positioning of the head is performed according to servo control, it is possible to perform efficient servo correction.

An embodiment of the invention will be hereinafter explained in detail with reference to the drawings. For clarification of the explanation, the following description and the drawings are omitted and simplified as appropriate. In the respective drawings, identical components are denoted by identical reference numerals and signs. For clarification of the explanation, redundant explanations are omitted when necessary.

This embodiment relates to pattern writing in a disk used in a disk drive device and specifically to processing for writing a new pattern in a different radial position with a pattern written by the disk drive device itself as a reference. One aspect of this embodiment relates to head position control in the pattern writing. In this embodiment, the invention will be explained taking processing for writing servo patterns in a hard disk drive (HDD), which is one of the disk drive devices, as an example.

In the HDD, Self Servo Write (SSW) for controlling a mechanical system of the device to write servo patterns is known. In the HDD of the preferred embodiment, a function performed by the external circuit in the conventional SSW is incorporated in an internal circuit itself on a product card (a board mounted with respective ICs of the HDD as a commercially available product). Consequently, the HDD may execute processing for writing servo patterns in a magnetic disk substantially only with an internal structure without directly depending a servo writer as an external apparatus. The HDD writes servo patterns in the magnetic disk with the function implemented in the internal circuit in response to a start signal from an external control apparatus. In other words, the HDD itself functions as a servo writer that writes servo patterns.

Thus, before explaining processing of the SSW in this embodiment, an overall structure of the HDD that executes the SSW in this embodiment will be explained. FIG. 1 is a block diagram schematically showing a structure of an HDD 1. The HDD 1 includes a magnetic disk 11 as an example of a disk that stores data, head element units 12, an arm electronic circuit (arm electronics: AE) 13, a spindle motor (SPM) 14, a voice coil motor (VCM) 15, and an actuator 16 in a closed enclosure 10.

The HDD 1 includes a circuit board 20 fixed to the outer side of the enclosure 10. ICs such as a read write channel (RW channel) 21, a motor driver unit 22, an integrated circuit of a hard disk controller (HDC) and an MPU (hereinafter referred to as HDC/MPU) 23, and a RAM 24 as an example of a volatile memory are provided on the circuit board 20. The respective circuit structures may be integrated into one IC or may be divided into plural ICs and mounted thereon.

Write data from an external host 51 is received by the HDC/MPU 23 and written in the magnetic disk 11 by the head element units 12 through the RW channel 21 and the AE 13. Read data stored in the magnetic disk 11 is read by the head element units 12. The read data is transferred from the HDC/MPU 23 to the external host 51 through the RW channel 21. The magnetic disk 11 is fixed to the SPM 14. The SPM 14 rotates the magnetic disk 11 at predetermined speed. The motor driver unit 22 drives the SPM 14 in accordance with control data from the HDC/MPU 23. The magnetic disk 11 of this example includes recording surfaces for recording data on both sides thereof. The head element units 12 as an example of heads are provided in association with the respective recording surfaces.

The respective head element units 12 are fixed to sliders (not shown). The sliders are fixed to an actuator 16. The actuator 16 is coupled to the VCM 15 and is rotated around a pivot shaft to move the head element units 12 (and the sliders) in a radial direction on the magnetic disk 11. The motor driver unit 22 drives the VCM 15 in accordance with control data (referred to as DACOUT in this specification) from the HDC/MPU 23. The head element units 12 include write elements that convert an electric signal into a magnetic field according to recording data to the magnetic disk 11 and read elements that convert a magnetic field from the magnetic disk 11 into an electric signal. This point will be described later. The number of magnetic disks 11 only has to be one or more. It is possible to form a recording surface on one side or on both sides of the magnetic disk 11.

The AE 13 selects one of the head element units 12 in which data access is performed out of the plural head element units 12. In the read operation, the AE 13 amplifies a read signal obtained by the selected head element unit 12 at a fixed gain, and sends the amplified signal to the RW channel 21. In the write operation, the AE 13 sends a recording signal from the RW channel 21 to the selected head element unit 12. In the SSW, typically, the AE 13 transfers a servo signal read by the head element unit 12 to the RW channel 21 and transfers write data (servo data) from the RW channel 21 to all the head element units 12.

The RW channel 21 subjects, in write processing, write data supplied from the HDC/MPU 23 to code modulation, further converts the write data subjected to the code modulation into a write signal, and supplies the write signal to the AE 13. The RW channel 21 amplifies, in read processing, a read signal supplied from the AE 13 to have a fixed amplitude, extracts data from the read signal acquired, and applies decode processing to the data. The data read from the disk includes user data and servo data. The read data subjected to the decode processing is supplied to the HDC/MPU 23. The RW channel 21 includes a clock circuit. Timing control of the SSW is executed in accordance with a clock signal generated by the RW channel 21.

In the HDC/MPU 23, the MPU operates in accordance with a microcode loaded to the RAM 24. According to the start of the HDD 1, other than the microcode running on the MPU, data required for control and data processing is loaded to the RAM 24 from the magnetic disk 11 or a ROM (not shown). The HDC/MPU 23 executes overall control of the HDD 1 in addition to necessary processing concerning data processing such as management of a command execution order, positioning control for the head element units 12 by using the servo data, interface control, and defect management performed. In particular, the HDC/MPU 23 controls execution of the SSW in this embodiment.

Figure 2:
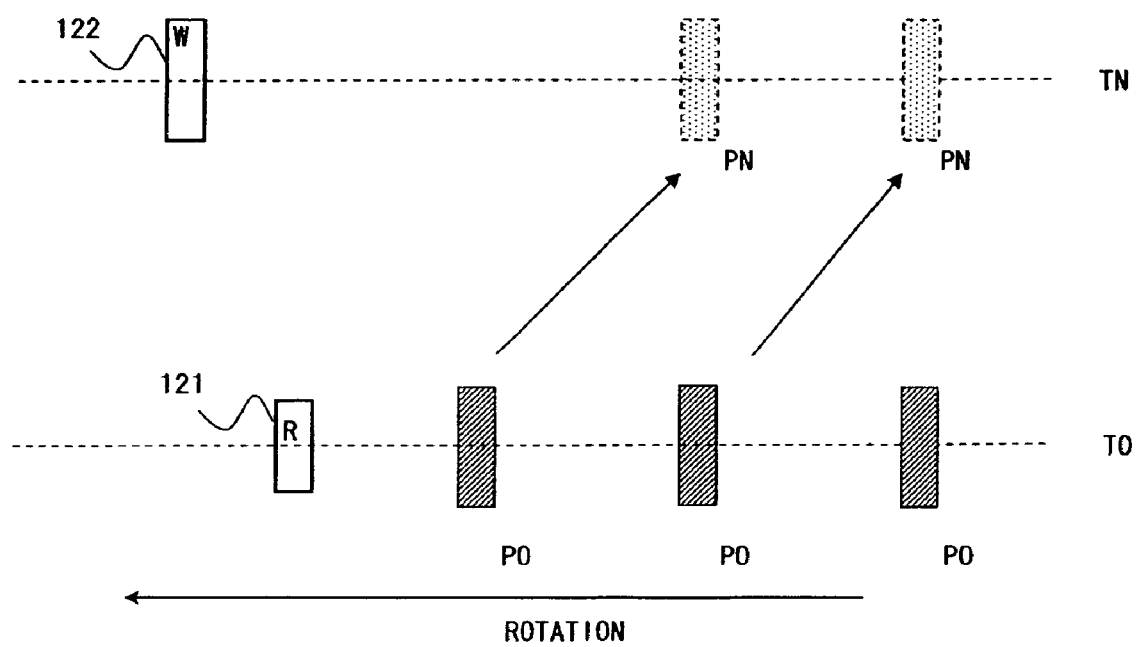
FIG. 2 is a diagram schematically showing a method of SSW according to one embodiment.

FIG. 2 schematically shows a method of the SSW. The SSW writes a new pattern PN with a write element 122 in the head element unit 12 arranged in a track TN on an outer radial (ID) side or an inner radial (OD) side while reading out a pattern PO written in a track TO on the inner radial side or the outer radial side with a read element 121 in the head element unit 12. In other words, while the read element 121 follows patterns of respective sectors of the reference track TO according to servo control, the write element 122 writes the new pattern PN in the track TN after predetermined timing from detection of the respective sectors. By performing the writing of the pattern while sequentially moving the head element unit 12 to the outer radial side or the inner radial side, it is possible to write the pattern over the entire recording surface of the magnetic disk 11.

The SSW is composed of several sequences. A final servo pattern (referred to as product servo pattern in this specification) for read/write of the user data is finally written on the entire surface of the magnetic disk 11. For the writing, the SSW in this embodiment writes a pattern of another type in an initial sequence other than a sequence for writing a product servo pattern using the product servo pattern (and a pattern of a format identical with the product servo pattern) on the magnetic disk 11. The pattern writing of the invention may be used for writing of any pattern as long as servo control is possible. However, in the following explanation, an example of propagation processing for the product servo pattern will be explained in detail.

Figure 3:
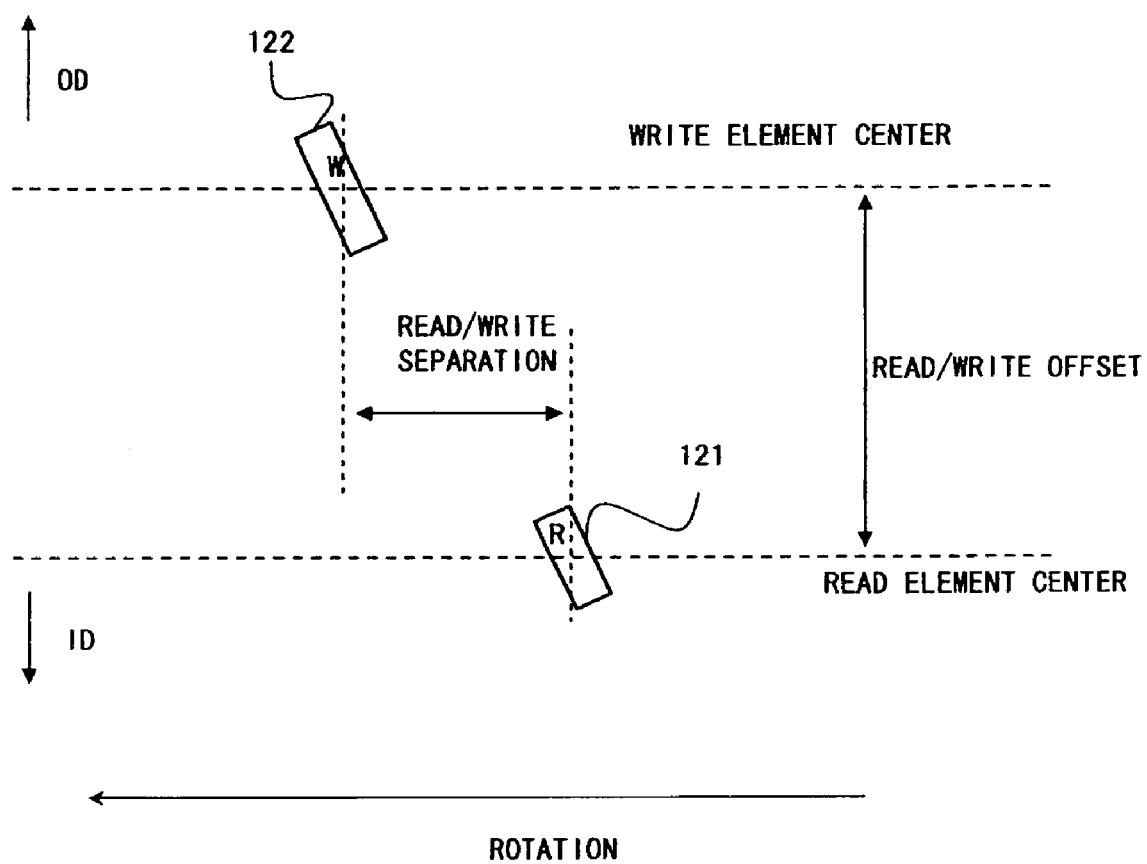
FIG. 3 is a diagram showing a positional relation between a read element and a write element in a head element unit according to one embodiment.

FIG. 3 shows a positional relation between the read element 121 and the write element 122 in the head element unit 12 in this embodiment. In this embodiment, a center position of the read element 121 is arranged further on the inner radial (ID) side of the magnetic disk 11 than a center position of the write element 122. When patterns are written from the inner radial side, the read element 121 may read a pattern written by the write element 122 earlier. Consequently, while the head element unit 12 is aligned according to the pattern read by the read element 121, the write element 122 may perform writing of the new pattern. In the following explanation, an example in which writing of servo patterns is performed from the inner radial side of the magnetic disk will be explained. It is possible to start the SSW from the outer side of the magnetic disk 11 by changing positions of the read/write elements 121 and 122. In the SSW in this embodiment, center positions of the elements in the circumferential direction are not specifically limited.

Moreover, FIG. 3 shows several values defined by a difference in the center positions of the read element 121 and the write element 122. One is Read/Write Separation. The Read/Write Separation is a distance in the circumferential direction of the magnetic disk 11 between the read element 121 and the write element 122. For example, after the center of the read element 121 reaches a specific circumferential direction position of a specific track (a radial position), the magnetic disk 11 rotates and the write element 122 reaches the identical circumferential direction position (on a different track). The time required for this is called Read/Write Separation Time.

Another is Read/Write offset. The Read/Write offset is a distance in the radial direction between the read element 121 and the write element 122. Specifically, the Read/Write offset is a distance in the radial direction of the magnetic disk 11 between the centers (a read element center and a write element center) of the read element 121 and the write element 122. The Read/Write offset depends on a skew angle and changes according to a position in the radial direction of the head element unit 12. In general, the Read/Write offset increases toward the OD side.

In this way, in this example, the Read/Write offset is present in all track positions from a track position on the most ID side to a track position on the most OD side. Consequently, it is possible to read servo patterns written on the inner radial side, perform alignment of the head element unit 12, and write servo patterns up to the track closest on the most OD side.

A (propagation) method of further extending writing of product servo patterns using a product servo pattern already written to the OD side will be specifically explained. An example in FIG. 4 has patterns of 2Ns sectors corresponding to one track. This number of sectors is twice as large as the number of sectors actually required. Servo patterns of a format identical with that of a product servo pattern are written in the respective sectors. Therefore, a half of the sectors written are used as product servo patterns in a final product. In the following explanation, the patterns of the respective sectors are referred to as servo patterns.

Writing of the respective servo patterns in one servo write track is performed using two rotations of the magnetic disk 11. In other words, odd number sectors and even number sectors are written in different rotations, respectively. Specifically, servo patterns of the odd number sectors are written with servo patterns of the even number sectors [0], [2], [4], [6], etc., as references in the first rotation. Patterns of the even number sectors are written with servo patterns of the odd number sectors [1], [3], [5], [7], etc. as references in the next rotation (this order may be opposite). When the servo patterns are used in a product, a half of the servo patterns (only the odd number servo patterns or the even number servo patterns) are used. It may be considered that, at the time of pattern writing, the respective tracks are defined by only the odd number sectors or the even number sectors.

Unlike the above explanation, it is possible to write product servo patterns of the necessary number of sectors (Ns/2) in one track and perform writing of product servo patterns in the same method as above. However, when writing of servo patterns is performed in two rotations of the magnetic disk 11, a deviation in the radial direction may occur between the servo patterns written in the first rotation and the second rotation or a deviation of time in a rotational direction may be a problem. On the contrary, the method described above may write all the servo patterns of the necessary number of sectors in a final product in one rotation of the magnetic disk 11, making it possible to prevent the aforementioned problems.

Figure 5A:
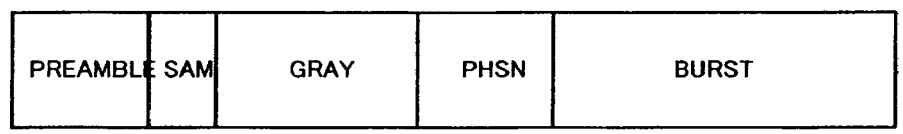
FIG. 5 is a diagram showing a format of a servo pattern.

FIG. 5(a) shows a format of one product servo pattern. The product servo pattern is composed of a preamble, a servo address mark (SAM), a track ID (GRAY) represented by a gray code, a servo sector number (PHSN), and a burst pattern (BURST). The preamble includes a pattern for detection of a phase of a readout signal and adjustment of an amplification factor of a signal amplifier.

The servo address mark indicates the beginning of servo data. The track ID indicates a track number of a track in which user data is finally recorded. The servo sector number indicates a number of a servo sector in one track. The burst pattern includes four kinds of patterns A, B, C, and D and indicates detailed positions of the read element 121 (the head element unit 12) in a track.

Figure 5B:
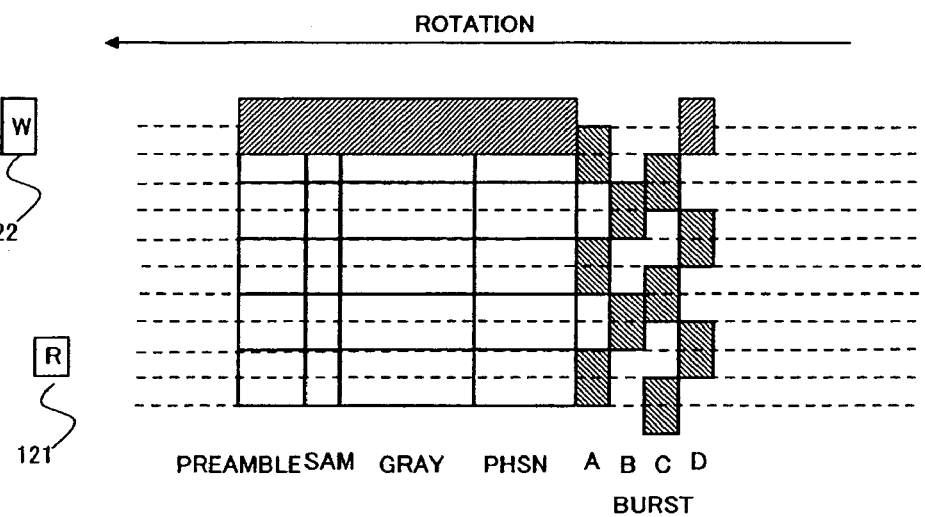

FIG. 5(b) schematically shows a form of writing servo patterns by the write element 122. Plural product servo tracks continuously located in the radial direction in one sector are shown in this figure. As shown in FIG. 5(b), the write element 121 writes the respective product servo patterns to partially overlap in the radial direction. In other words, in formation of the respective product servo patterns, a part of each of the patterns is overwritten on a pattern on the outer radial side. Specifically, the write element 121 writes a half in the radial direction of the product servo patterns in one rotation of the magnetic disk.

Tracks equivalent to a half of the product servo patterns are referred to as servo write tracks. A track pitch of the servo write tracks is a half of a data track pitch in which the user data is stored. When the product servo patterns having an identical track ID are one servo track, the servo write track is a half of the servo track. The track TN written anew in the explanation referring to FIG. 3 is this servo write track. In an example in FIG. 5(b), servo patterns written over ten servo write tracks are shown.

The HDC/MPU 23 positions the read element 121 (the head element unit 12) in a desired position using the track ID (Gray) and the burst pattern (BURST). The HDC/MPU 23 uses readout timing of a servo address mark as reference timing in writing of a new pattern.

In order to reduce additional functions dedicated to the SSW, it is preferable that the HDD 1 propagates the product servo patterns using only patterns of a format identical with that of final product servo patterns. Besides, an additional timing pattern, burst pattern, or the like may be provided or positioning and writing timing control for the head may be performed using the additional pattern.

As it is understood from the above explanation, although a target position of the read element 121 may coincide with the center of the servo write track, the position deviates from the center in many cases. As it is seen from the fact that the burst of the product servo patterns is used, the servo control in the positioning of the head element unit 12 uses readout signals for patterns of plural servo write tracks.

Therefore, a track (TO in FIG. 2) followed by the read element 121 is not necessarily identical with the servo write track. Patterns of the track followed by the read element 121 may be regarded as respective patterns with a predetermined width at a radial position of the target as a center, and patterns of respective sectors used for positioning the read element 121 at the target position. As explained with reference to FIG. 4, when a part of the patterns in an identical radial position are read, tracks composed of the part of the sectors may be regarded as one track (TO). Similarly, when a part of the sectors at the identical radial position are written, tracks formed by the part of the sectors may be regarded as one track (TN).

Figure 6:
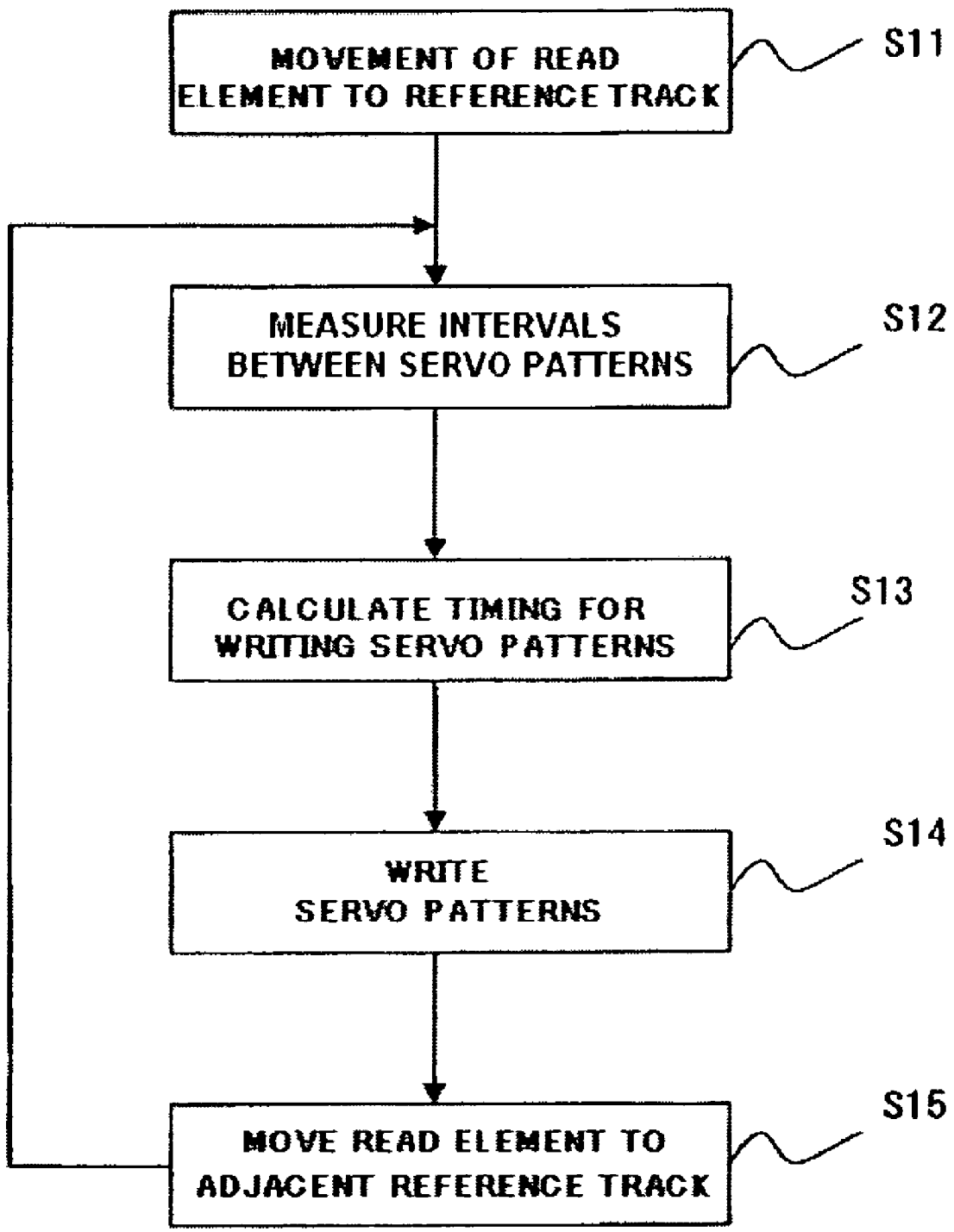
FIG. 6 is a flowchart for explaining the process for writing a product servo pattern.

Processing for writing a product servo pattern will be explained with reference to FIGS. 4 to 6. In S11 of the flowchart in FIG. 6, the read element 121 moves to a track (TO in FIG. 4) corresponding to a reference position and follows this reference position as a target position (track). The HDC/MPU 23 generates a position signal from a track ID and burst patterns read by the read element 121.

The HDC/MPU 23 selectively uses A, B, C, and D according to a position of a target of the read element 121 and calculates position signals from track IDs and ratios of amplitudes of predetermined burst patterns in A, B, C, and D. The HDC/MPU 23 positions the read element 121 such that values of the position signals take a predetermined value. The SSW according to this embodiment has characteristic aspects in the positioning of the head element unit 12, in particular, the track following control of the head element unit 12. This point will be described later.

Subsequently, in S12, the HDC/MPU 23 measures time intervals between sectors by measuring time intervals between detection timings of the SAM. The HDC/MPU 23 executes the measurement using a clock signal generated by the RW channel 21 with Index as a reference. The Index is a signal generated by the motor driver unit 22, which drives the spindle motor 14, according to a electromotive force of the spindle motor and is defined by a rotation period of the spindle motor 14.

Figure 4:
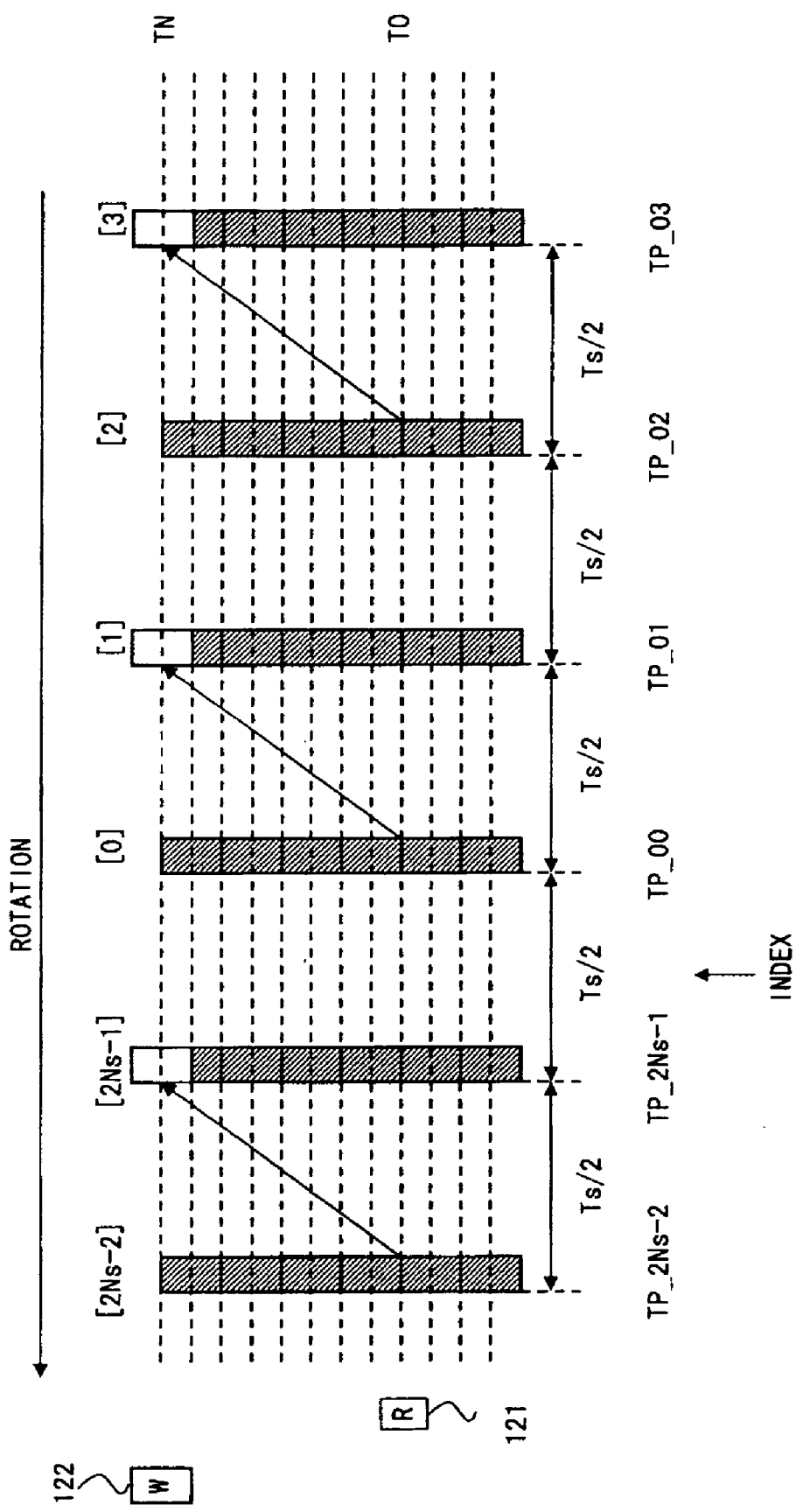
FIG. 4 is a diagram showing a method of further extending writing of a servo pattern to an OD side using a servo pattern on an ID side by rotating a magnetic disk twice.

In the example in FIG. 4, a time measurement result from a product servo pattern immediately after the Index is defined as TP_00, TP_01, TP_02, . . . TP_2*Ns-1. Suffixes 00, 01,02, . . . 2*Ns-1 are sector numbers. The number of servo sectors in this example is twice as large as the number of servo sectors of a final product. When time intervals among final product servo sectors (servo patterns) are set as Ts, time intervals among the sectors in propagation are Ts/2.

Subsequently, in S13, the HDC/MPU 23 calculates the writing time from the measured interval between servo patterns by correcting for a read write separation time of the head element unit 12 and a time from the start of the preamble to the SAM. The writing timing is a timing for starting writing of servo patterns of the respective sectors in the outer radial side track TN with detection timing of the SAM of the inner radial side reference track TO (the reference target position) as a reference.

In S14, the head element unit 12 writes a servo pattern in the OD side track TN using the results of the calculation and a servo pattern of an immediately preceding sector. The writing of the servo patterns is performed using two rotations of the magnetic disk 11. Servo patterns of odd number sectors are written with servo patterns of even number sectors [0], [2], [4], [6], etc. as references in the first rotation. Servo patterns of even number sectors are written with servo patterns of odd number sectors [1], [3], [5], [7], etc. as references in the next rotation. It is preferable to distinguish the odd number sectors and the even number sectors using SAMs of different types. When the writing in one track is finished, the read element 121 is moved to an adjacent track (target position) on the OD side (S15) and the above processing is repeated.

It is possible to form a track TN composed of a new servo pattern PN on the outer radial side by following the servo pattern PO already written in the track TO as a reference on the inner radial side according to the sequence described above. In this way, in the propagation of the pattern for writing the new track TN on the outer radial side, it is expected that, basically, accuracy in the radial direction of the pattern PO as the reference on the inner radial side (positioning accuracy of the head element unit 12) is directly inherited by the pattern PN written anew.

However, because of various factors that cause errors, this accuracy is deteriorated by propagation. The deterioration in positioning accuracy causes deviations from original positions of the burst patterns A, B, C, and D among the servo patterns. This deviation is inherited at the time of the next propagation. This process also depends on a closed loop response of the servo operation which enables the head element unit 12 to follow a track. In this way, the deterioration in accuracy is caused by a complicated mechanism involving various factors.

In order to prevent this deterioration in track follow accuracy due to propagation, in the SSW in this embodiment, a target position of the reference track TO in writing the servo write track TN is corrected. The target position is represented by a target value of a position signal calculated from a signal read by the read element 121. A signal indicating a deviation (a position error) from the target position (the target value) is referred to as a position error signal (PES). The PES may be represented by (target position-present position), in which the present position is obtained from a servo signal read by the read element unit 121.

Figure 7:
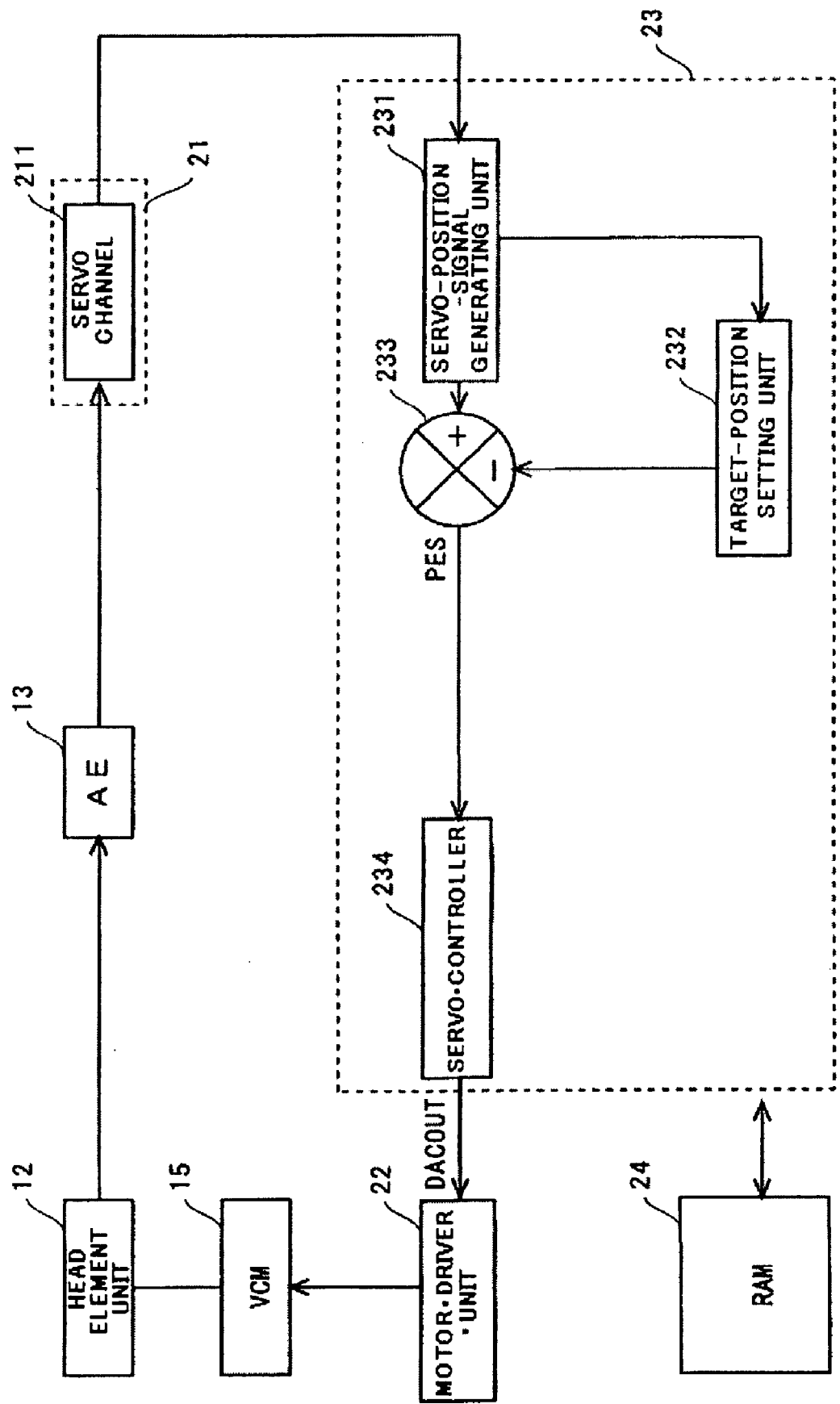
FIG. 7 is a block diagram showing a structure of a servo system according to one embodiment.

Before explaining a specific method of calculating a correction value of a target value, a servo system of the HDD 1 will be explained. FIG. 7 is a block diagram showing a structure of the servo system in this embodiment. The RW channel 21 includes a servo channel 211 that extracts a servo signal from an output signal from the AE 13. The HDC/MPU 23 includes a servo-position-signal generating unit 231 that generates a servo position signal, a target-position setting unit 232 that sets a target position of the head element unit 12, a position-error calculating unit 233 that calculates a difference between the servo position signal and a target position signal from the target-position setting unit 232 as a reference signal, and a servo controller 234 that outputs a digital control signal (DACOUT) for controlling the VCM 15 (controlling a current amount of the VCM 15) to the motor drive unit 22.

The respective components in the HDC/MPU 23 may be realized by a hardware logic or a microcode controlled portion by the MPU operation. As a configuration of hardware/software, an appropriate configuration implementation is selected in accordance with a design. It is also possible to mount respective logical blocks for executing necessary processing in any hardware configuration according to a design.

The servo channel 211 AD-converts an analog servo signal from the AE 13 at a predetermined sampling frequency. Moreover, the servo channel 211 decodes a servo address from the signal AD-converted. The address decoded and the burst signal AD-converted are transferred to the servo-position-signal generating unit 231.

The servo-position-signal generating unit 231 generates, on the basis of the servo signal from the servo channel 211, a servo position signal indicating a present position of the head element unit 12. Specifically, the servo position signal is composed of a track number and a burst position signal. Moreover, the servo-position-signal generating unit 231 generates a sector number. The track number and the burst position signal are inputted to the position-error calculating unit 233 and the sector number is inputted to the target-position setting unit 232. For example, data with the track number set as a high order bit and the burst position signal set as a low order bit is inputted to the position-error calculating unit 233.

The target-position setting unit 232 outputs a target position signal indicating a target position to which the head element unit 12 (the read element 121) should move. The target position signal is inputted to the position-error calculating unit 233. The target position signal includes a track number and a burst position signal of the target positions. The HDD 1 in this embodiment has a characteristic feature in the target-position setting unit 232. A specific explanation of the processing will be described later.

The position-error calculating unit 233 compares the servo position signal and the target position signal and generates a position error signal (PES) indicating a level of a deviation and a direction of the present position with respect to the target position. The PES represents the amount of the deviation of the head element 12 from the target position in the radial direction of the magnetic disk 11.

The PES generated by the position-error calculating unit 233 is inputted to the servo controller 234. The servo controller 234 generates a digital control signal DACOUT of the VCM 15 based on the PES. The DACOUT is inputted to the motor driver unit 22. The motor driver unit 22 DA-converts the DACOUT and supplies an electric current specified by DACOUT value to the VCM 15.

A method of correcting a target position of the reference track TO will be specifically explained. A process described below is executed when either the odd number sectors or the even number sectors in FIG. 4 are followed. In S14, the target-position setting unit 232 follows the track TO before writing of a servo pattern and acquires PESs of the respective sectors. When necessary, the target-position setting unit 232 calculates an average of the PESs of the respective sectors by following the track in plural rotations.

The target-position setting unit 232 calculates position correction values of the respective sectors from a correction operator calculated in advance and a PES vector (|PES>|) of all the PESs of the respective sectors acquired or PESs of selected plural sectors. Here, |> means a column vector and <| means a row vector.

Specifically, the target-position-setting unit 232 calculates an inner product of the PES vector (|PES>) and a correction vector (<H_i|) as a correction operator corresponding to each sector i and calculates correction values for target values of the respective sectors. In other words, a position correction value d_i of each sector i may be represented as follows.

$$d\_i = <H\_i|PES> \qquad \text{(Equation 1)}$$

This is a multiply-and-sum operation of respective elements of the correction vector (<H_i|) and the PES vector (|PES>). When an element of <H_i| is $h_{i,n}$ ($0 \leq n \leq N-1$), the multiply-and-sum operation may be represented as follows.

$$d\_i = \Sigma n h_{i,n} PES_n, 0 \leq n \leq N-1 \quad \text{(Equation 2)}$$

Here, $\Sigma n$ means a sum of respective elements when n is 0 to (N−1). N is the number of all the even (or odd) sectors and is equivalent to Ns in FIG. 4. Further, n is a numeral indicating the respective sectors. For example, n may be counted with INDEX shown in FIG. 4 as a reference.

The correction vector (<H_i|) corresponds to respective rows of the correction matrix H. Here, a position correction value vector with position correction values of the respective sectors as elements is represented as follows.

$$|d> = (d\_0, d\_1, d\_2, \ldots d\_N-1) \quad \text{(Equation 3)}$$

The position correction value vector (|d>) is a product of the PES vector |PES> and the correction matrix H and is represented as follows.

$$|d> = H|PES> \quad \text{(Equation 4)}$$

Figure 8:
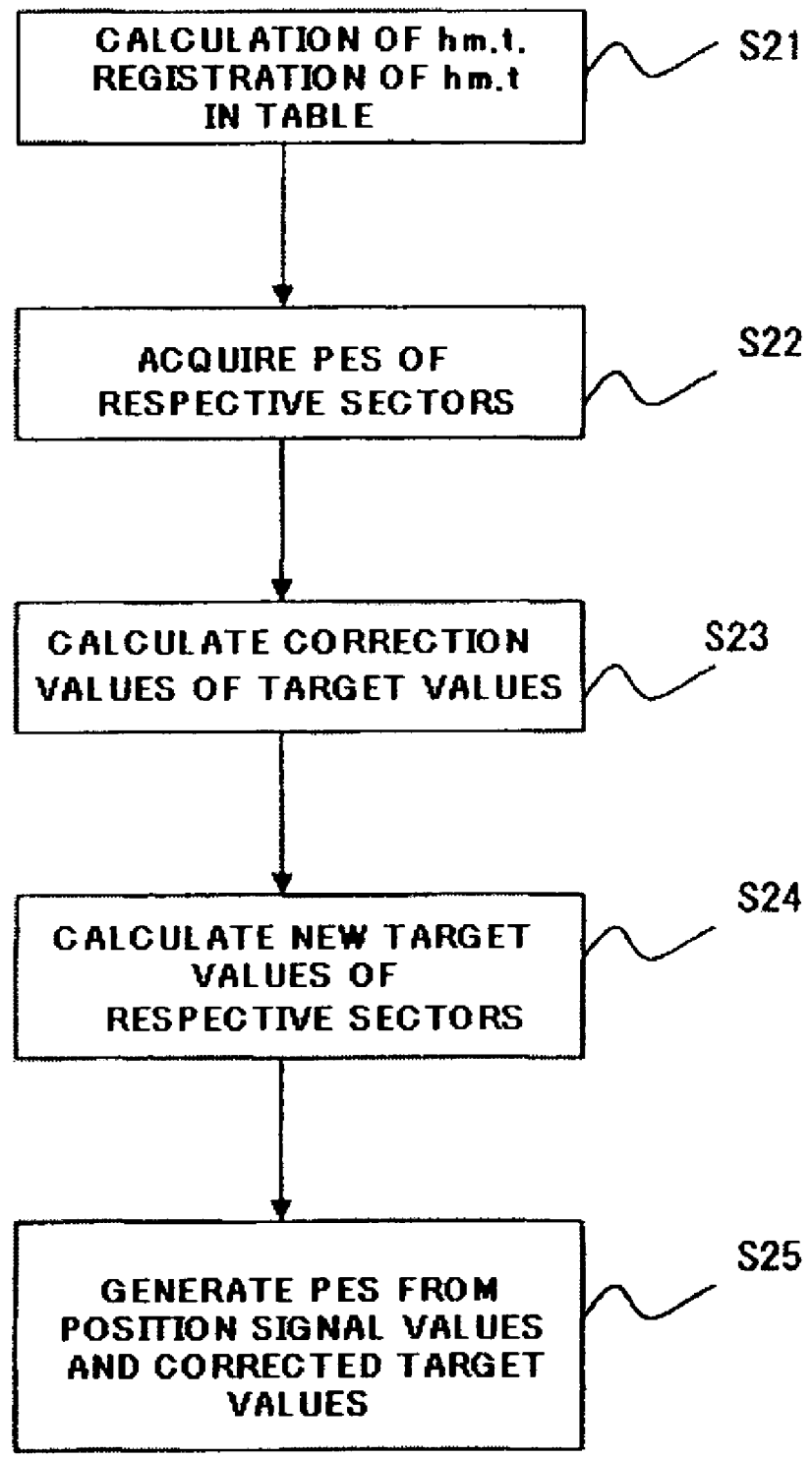
FIG. 8 is a flowchart showing the process for correcting a target value.

The target-position setting unit 232 may correct target positions in respective tracks by calculating the correction matrix H in advance. As shown in a flowchart in FIG. 8, the target-position setting unit 232 calculates the correction matrix H, i.e., the respective coefficients $h_{i,n}$ of the multiply-and-sum operation in advance and registers the coefficient $h_{i,n}$ in a table in the RAM 24 (S21). The position-error calculating unit 233 acquires, before actually writing servo patterns in the processing for writing servo patterns of the respective tracks, PESs of respective sectors read by the read element 121 in target positions corresponding to the sectors (S22). The target-position setting unit 232 performs a production-sum operation of the PESs of the respective sectors acquired and the elements of the correction matrix H to calculate correction values of the sectors (S23). Moreover, the target-position setting unit 232 calculates new target values of the respective sectors using the correction values of the respective sectors calculated (S24).

In track follow for writing a new servo pattern, the target-position setting unit 232 outputs a corrected target position signal to the position-error calculating unit 233. The position-error calculating unit 233 compares a servo position signal and the corrected target position signal to generate a PES (S25).

Since the target-position setting unit 232 acquires the coefficients $h_{i,n}$ in prior to the servo write operation with head following the previously written track, even an MPU mounted on the HDD 1 with small arithmetic operation power may process correction of a target position in a short time. It is possible to use identical coefficients as the respective coefficients $h_{i,n}$ in writing on the entire recording surface of the magnetic disk 11. However, preferably, calibration is executed at intervals of about several thousand tracks to execute recalculation of the respective coefficients $h_{i,n}$. Since influences of a flow of wind, a force of a flex cable, and the like are different depending on an actuator position, it is preferable to execute the calibration of the coefficients $h_{i,n}$ at appropriate track intervals.

Figure 9:
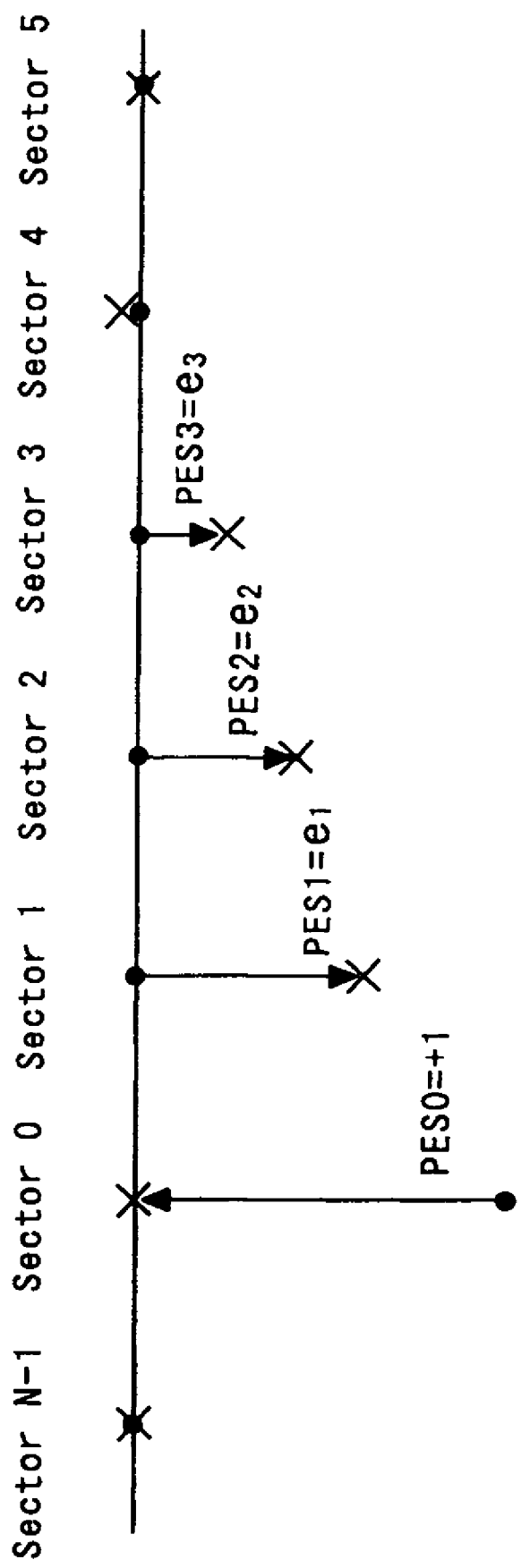
FIG. 9 is a diagram showing an example in which, when the read element is following a track TO, among respective sectors of TO, only a servo pattern of sector_0 deviates by "−1" and the other sectors are on a complete circle.

Subsequently, a method of calculating this correction matrix H will be specifically explained. Here, a case in which the respective sectors of T0 at the time when the read element 121 is following the track T0 are on a perfect circle except one sector and the read element 121 is clearly following the track T0, will be considered. FIG. 9 shows an example in which only a servo pattern of Sector_0 deviates from a perfect circle by "−1". In FIG. 9, black circles indicate servo patterns of respective sectors and x indicates positions of the read element 121. This is equivalent to a case in which there is irregularity of an impulse at one sector. Therefore, the track follow in the track T0 is disturbed by the irregularity and the disturbance is directly reflected on a position of the track TN which is written by a write head 122 using the SSW process described hitherto.

Here, deflection in the track T0 due to this irregularity of the impulse form, i.e., deflection of the track TN written is basically described in a transfer function of a closed loop of this servo system. Time series of an output with respect to an impulse input may be calculated by inverse Z transform of the transfer function. When the transfer function is represented by frequency components, the time series are described by inverse Fourier transform of the transfer function.

Therefore, if the closed loop transfer function of the servo system is known, deviations e_i (i is positive integers from 0 to N−1) from the complete circle in the respective sectors are calculated. Here, e_0 is 0, because the read element 121 is not moved yet at an instance when the servo system detects irregularity at the sector_0. Here, a PES (PES0) in the Sector_0 is set to "+1". As described above, since the position of the servo pattern of the Sector_0 is "−1", the PES0 is "+1". PESi of the respective sectors due to the deviation of the Sector_0 coincides with e_i, i.e., PESi=e_i. Therefore, a PES vector as a response to the impulse input is as follows.

$$|PES> = (e\_1, e\_2, e\_3, e\_4, \ldots, e\_N-1) \quad \text{(Equation 5)}$$

Actually, a position error from the complete circle of the respective sector patterns in an actual space is present as d_i in respective sectors Sector_i. This position error is equivalent to a correction value of the target position. PESj in the Sector_j due to the position error from the complete rounds of the respective sectors may be represented as follows.

$$PESj = d\_j - \Sigma i (d\_i \times e\_j - i) \quad \text{(Equation 6)}$$

Here, $\Sigma i$ means a sum of respective elements when i is 0 to (N−1) excluding j.

Equation 6 above may be represented as follows using the position error PES from the target, the respective vector representations of a position error d from the complete rounds, and a matrix K of an operation coefficient.

$$|PES> = K|d> \quad \text{(Equation 7)}$$

Here, the matrix K may be represented as follows from the above explanation.

$$K = \begin{bmatrix} 1 & e\_N-1 & e\_N-2 & & e\_2 & e\_1 \\ e\_1 & 1 & e\_N-1 & & e\_3 & e\_2 \\ e\_2 & e\_1 & 1 & & e\_4 & e\_3 \\ & & & & & \\ & & & & e\_N-1 & e\_N-2 \\ e\_N-2 & e\_N-3 & & & 1 & e\_N-1 \\ e\_N-1 & e\_N-2 & & & e\_1 & 1 \end{bmatrix} \quad \text{(Equation 8)}$$

While the read element 121 is following a track, a PES vector in the target track is observed. From the above equation, it is possible to calculate a deviation d_i from an ideal position of servo patterns of the respective sectors and a vector |d> thereof by multiplying this PES vector by an inverse matrix $K^{-1}$ of the matrix K. In other words, it is possible to calculate correction values of target values of the respective sectors and vectors representing the correction values. When respective elements of the inverse matrix $K^{-1}=H$ of the matrix K is set as $h_{m,n}$, the position errors d_i from the complete circle of the respective sectors may be represented as follows.

$$d\_i = \Sigma n h_{i,n} PES_n, 0 \leq n \leq N-1 \quad \text{(Equation 9)}$$

$\Sigma n$ is a sum of n.

It is evident from the structure of K that a structure of the matrix H takes a form described below.

$$H = \begin{bmatrix} h_0 & h_1 & h_2 & & h_{N-1} \\ h_{N-1} & h_0 & h_1 & & h_{N-2} \\ h_{N-2} & h_{N-1} & h_0 & & h_{N-3} \\ & & & & \\ & & & & \\ h_1 & h_2 & h_3 & & h_0 \end{bmatrix} \quad \text{(Equation 10)}$$

In other words, a relation of the following equation is satisfied among elements of the matrix H.

$$h_{m,n} = h_{n-m} \quad \text{(Equation 11)}$$

Here, (n-m) indicates numbers from 0 to N-1 to the modulus N. For example, $-1 = (N-1)$.

The position errors d_i from the complete circle of the respective sectors are correction values of target values of the respective sectors. A new target value corrected is (T_i-d_i) with respect to a present target value T_i. In other words, as described above, the target-position setting unit 232 calculates correction values of the respective sectors from the matrix H and the PES vector actually measured. The servo controller 234 calculates DACOUT from the PES with new target values corrected by the correction values as references.

In general, it is considered that time series of an output with respect to an impulse input substantially converges within an appropriate number of sectors (position errors decrease to substantially 0). For example, when e_4 to e_N-1 are 0, the operation matrix K above is represented as follows.

$$K = \begin{bmatrix} 1 & 0 & 0 & & e\_2 & e\_1 \\ e\_1 & 1 & 0 & & e\_3 & e\_2 \\ e\_2 & e\_1 & 1 & & 0 & e\_3 \\ & & & & & \\ & & & & 0 & 0 \\ 0 & 0 & & & 1 & 0 \\ 0 & 0 & & & e\_1 & 1 \end{bmatrix} \quad \text{(Equation 12)}$$

Therefore, the target-position setting unit 232 may calculate the matrix H using only impulse response elements of the number of sectors set in advance smaller than the number of all the sectors, and it is thus possible to simplify an arithmetic operation for calculation of an inverse matrix without degrading the accuracy of the correction. For example, in an example in the above description (Equation 12), the target-position setting unit 232 calculates the inverse matrix H of the matrix K using deviations (e_1 to e_3) to three sectors succeeding the input of the impulse.

As described above, the PES vector (e_1, e_2, . . . , e_N-1) is the impulse response of the servo system and is an inverse Fourier transform (an inverse Z transform) of the transfer function of the closed loop. The target-position setting unit 232 needs to specify an impulse response of the servo system in order to determine the matrix K.

Several methods are conceivable as a method to obtain an impulse response of the servo system, i.e., the PES vector (e_1, e_2, . . . , e_N-1). One is a method of intentionally adding, while following a track, a predetermined amount of deviation to a target value in one sector and measuring a change in PESs of the respective sectors after the application of the impulse. The HDC/MPU 23 may specify an impulse response of the servo system from a difference in a PES change between a case in which the deviation is not added and a case in which the deviation is added.

As another method, the HDC/MPU 23 may calculate a frequency response of a transfer function by performing servo control with applying a sine wave of harmonics of a rotation frequency of the magnetic disk 11 to the VCM 15 and measuring a frequency component of positional information (PES) of the head element unit 12. The HDC/MPU 23 calculates a servo transfer function of a closed loop from the thus obtained frequency response. Moreover, the HDC/MPU 23 may perform inverse Fourier transform of the transfer function and specify an impulse response of the servo system.

As indicated by Equations 2 and 9, the calculation of the correction values d_i of the respective sectors indicates that a multiply-and-sum operation of a PES in a target and elements of a row vector of the matrix H is performed. Moreover, as it is seen from the respective elements of the matrix H in Equation 10, a term of a multiply-and-sum only has to be cyclically changed every time a sector is changed to another sector. It is possible to calculate a correction value according to a simple calculation in this way. In other words, correction values d_i of target values in the respective sectors [i] are give by the following equation.

$$d\_i = \sum_{t=0}^{N-1} h_{N-i+t} PES_t \quad \text{(Equation 13)}$$
$$= \sum_{k=i}^{i-1} h_{k-i} PES_k$$

(k and k − i are cyclic numbers from 0 to N − 1)

Figure 10:
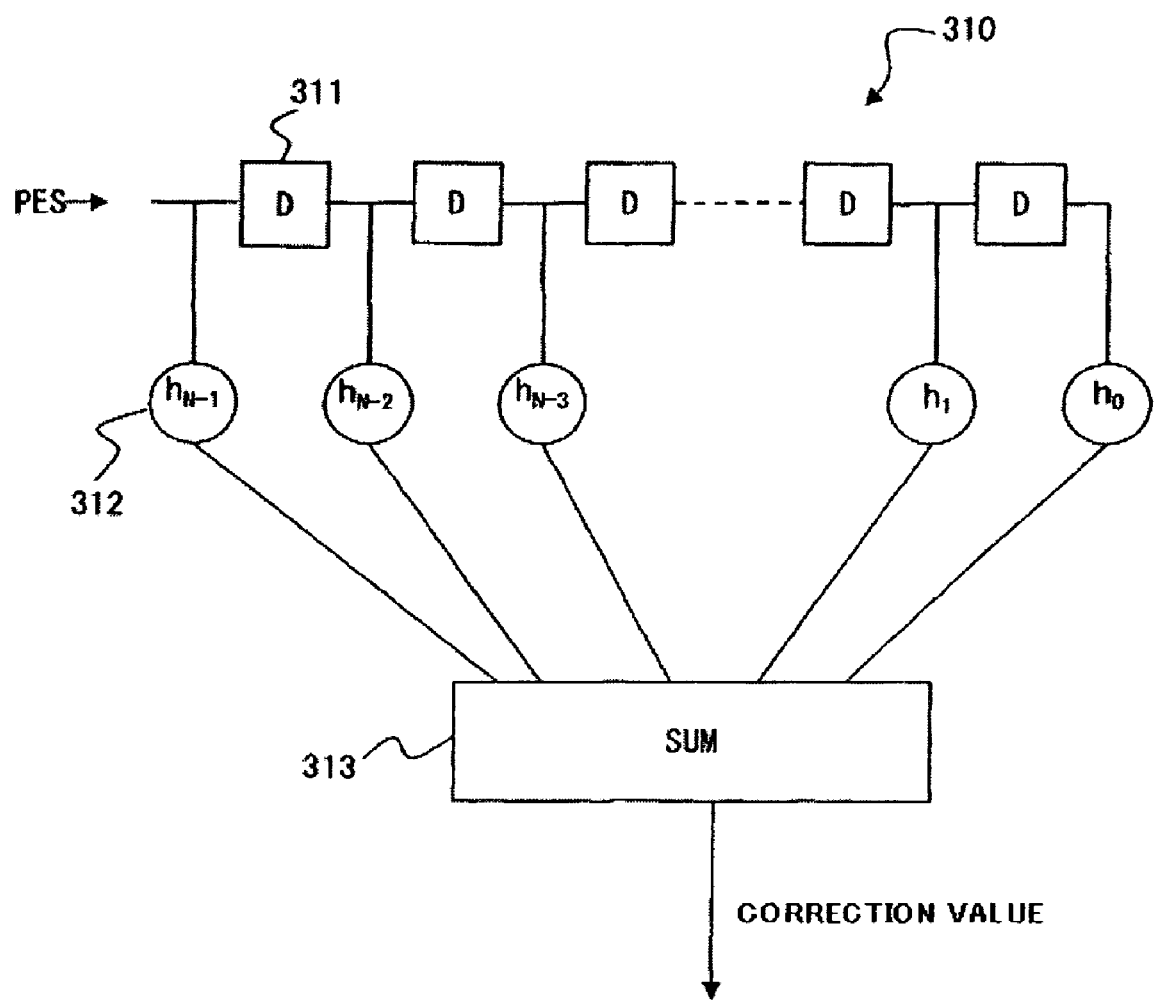
FIG. 10 is a block diagram showing a functional structure of an FIR filter in a target-position setting unit.

It is possible to implement this arithmetic operation as an FIR (Finite Impulse Response) filter. With the FIR filer, an efficient arithmetic operation by an MPU is possible and even an MPU with small calculation power is capable of performing high-speed processing. As shown in FIG. 10, an FIR filter 310 is constituted by delay elements 311 that delay a PES by one clock, tap weights 312 (integration) that set elements of the matrix H as coefficients, and a sum element 313 that adds up respective values processed by the tap weights 312.

The FIR filter 310 is an FIR filter with N taps, and the tap weights h0 to hN-1 are associated with the respective taps. In other words, outputs from the respective taps are multiplied by the tap weights. PESs as a time series are sequentially inputted to the FIR filter 310. For example, in an arithmetic operation of the sector [0], respective values of PES[0] to PES[N-1] are outputted from the respective taps. Here, it is possible to constitute the FIR filter 310 with hardware. It is also possible to implement the FIR filter 310 in a microcode and execute FIR processing with an MPU.

Figure 11:
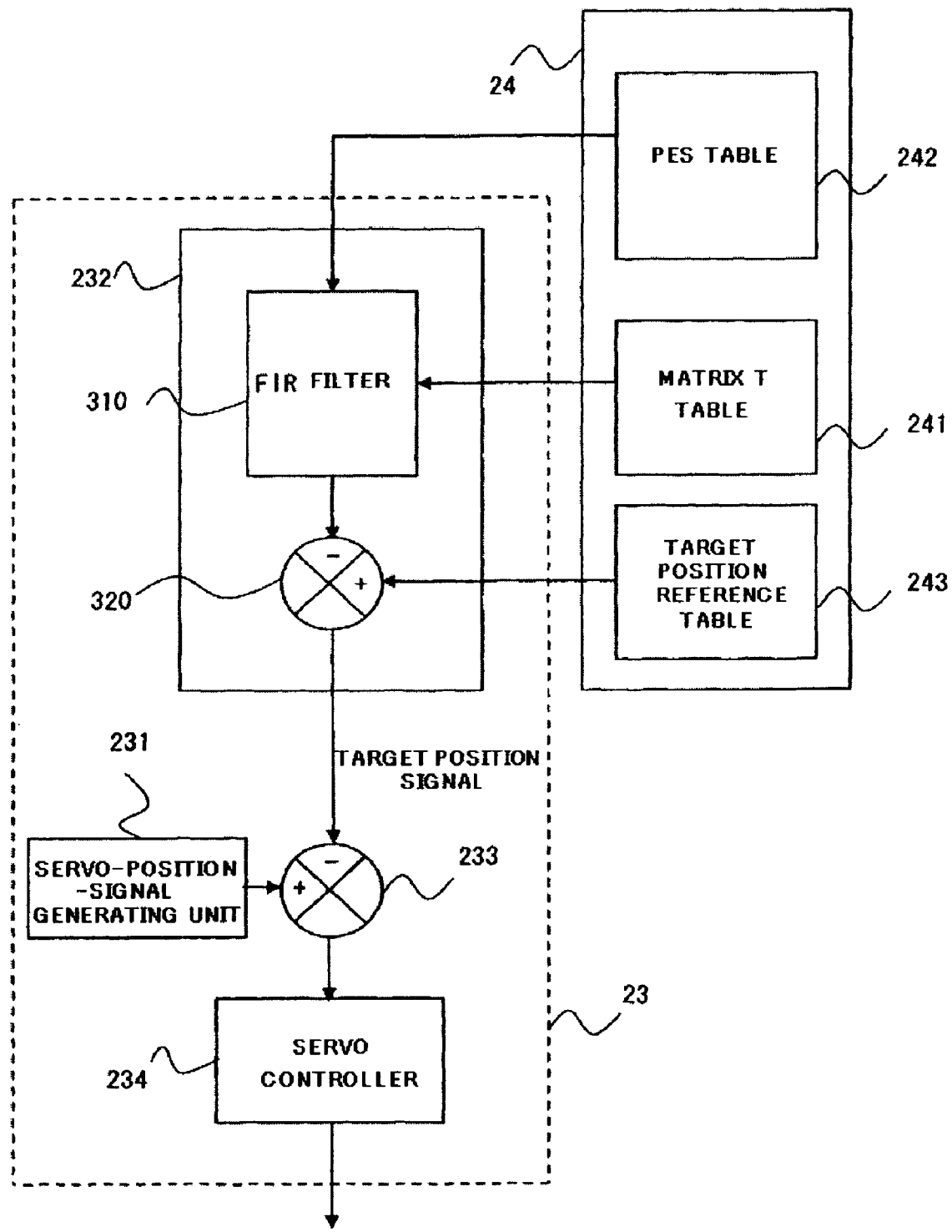
FIG. 11 is a block diagram of functional units for correction of a target value and servo control percomposed of using the target value.

FIG. 11 is a block diagram of functional units for processing for generating a target position signal. In the RAM 24, respective elements of the matrix H are registered in a matrix H table 241 and PESs of respective sectors in a target (TO in FIG. 2) in writing a servo pattern are registered in a PES table 242. In the PES table 242, the position-error calculating unit 233 registers PESs corresponding to the respective sectors. In a target-position reference table 243, reference values of target values of servo position signals corresponding to respective servo tracks are registered. Specifically, the target-position reference table 243 is composed of target track numbers and respective reference values of target PESs.

The target-position setting unit 232 acquires matrix elements, i.e., tap weights from the matrix H table 241 and uses the tap weights as the tap weights 312 of the FIR filter 310. According to a following operation of the read element 121, the target-position setting unit 232 acquires the PESs of the respective sectors of the corresponding servo tracks registered in the PES table 242 and sequentially inputs the PESs to the FIR filter 310 to generate correction values of the respective sectors. Moreover, the target-position setting unit 232 acquires the target reference values from the target-position reference table 243 and corrects the target reference values using correction values generated by a correction operation unit 320. The target-position setting unit 232 outputs the target values corrected to the position-error calculating unit 233 as target position signals.

Here, it is preferable to reduce the number of taps of the FIR filter 310, i.e., shorten the multiply-and-sum operation of Equation 2 or 9 to reduce the total amount of calculation. It is possible reduce a calculation time for correction values by reducing the number of taps. However, a situation, in which the accuracy of the correction is degraded by reducing the number of taps and a large position error due to accumulation of propagation errors occurs, has to be prevented.

As described above, when the servo operates normally, it is possible to regard the impulse response (e_i) as 0 after a certain number of sectors have passed by from the application of the impulse response. Therefore, hi only has to be considered only in a range of a certain degree before and after a sector of attention for which a correction value is calculated. For example, a deviation from an ideal position of a servo position of Sector0 may be calculated as follows.

$$d\_0 = (h_{N-m}, \ldots h_{N-1}, h_0, h_2 \ldots h_m) \begin{pmatrix} PES_{N-m} \\ \ldots \\ PES_0 \\ \ldots \\ PES_m \end{pmatrix}$$ (Equation 14)

Here, m is a positive integer.

In other words, when a sector [k] is written, a target position is corrected using PESs of plural sectors before and after the sector including the sector to be corrected. A positional deviation of each sector indicates strong correlation with position errors of near sectors before and after the sector to be corrected and the correlation is smaller in sectors more distant from the sector. In other words, as a sector is more distant from the sector, a value of h is smaller. Therefore, it is possible to attain sufficient position error correction by using only position error of the sector to be corrected and sectors in the neighborhood of the sector in the arithmetic operation.

In this way, in the calculation of the correction values of the respective sectors, PESs of continuous plural sectors including a PES of a sector to be corrected are used. The number of sectors used is smaller than the number of all sectors read by the read element 121. An appropriate number is selected by design. Positional deviation of each sensor has strong correlation with positional deviations of sector before and after the sector. Thus, it is preferable that calculation of a correction value includes PESs of the sectors before and after the object sector. Using continuous several sectors or several tens sectors in the same number before and after the sector is a preferred example.

Using a value αd_i (0<α<1) obtained by multiplying d_i by a coefficient α smaller than 1 as correction values of target values of the respective sectors rather than directly using d_i calculated as described above is one of the preferred forms. For example, it is possible to set α to 0.5. Typically, α is identical for the respective sectors. This is because, since various kinds of noise are present in an actual system, it is likely that overcorrection occurs if the correction values of the target values are set identical to d_i, which is a deviation from an ideal value. Therefore, it is preferable to multiply d_i by an appropriate coefficient to adjust the correction values. An appropriate value is set as the coefficient in accordance with the servo system of the HDD. This holds true in the following explanation.

Figure 12:
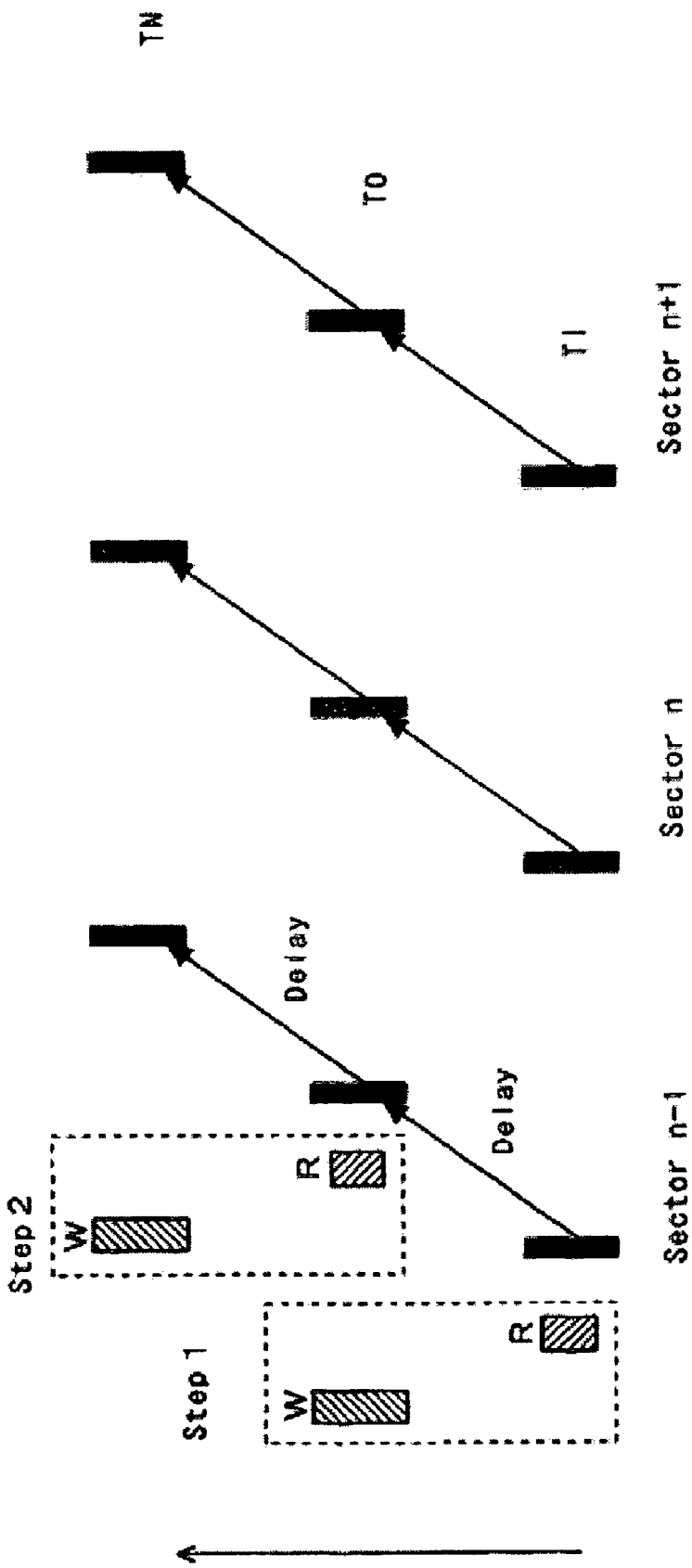
FIG. 12 is a diagram schematically showing that correction values of respective sectors in a target track TO is calculated using PESs of respective sectors in a target track TI at the time when the target track TO is written.

In the example described above, a PES of the target track TO of the read element 121 for writing the track TN is directly read and correction values of the respective sectors in the target track TO are calculated using the PES read. On the other hand, as shown in FIG. 12, it is possible to calculate correction values of the respective sectors in the target track TO using PESs of the respective sectors in the target track TI in writing the target track TO.

When the PES of the track TO is used, it is necessary to make at least one rotation of the disk in order to measure PESs of the respective sectors of the track TO. On the other hand, when a PES of the track TI read when the track TO is written is used, it is not necessary to measure a PES of the track TO in order to calculate correction values and it is possible to realize a reduction in total self servo writing time.

In writing a servo pattern of the track TO, the read element 121 reads respective sector patterns of the track TI. The servo system positions the read element 121 using PES of a position signal read out by the read element 121 and a target position. Therefore, position errors in the respective sectors of the track TI are reflected on a position of a pattern written in the track TO. A case, in which the respective sectors of TO at the time when the read element 121 is following the track Ti are on a complete circle except one sector and the read element 121 is following the track TI as shown in FIG. 13, will be considered.

Figure 13:
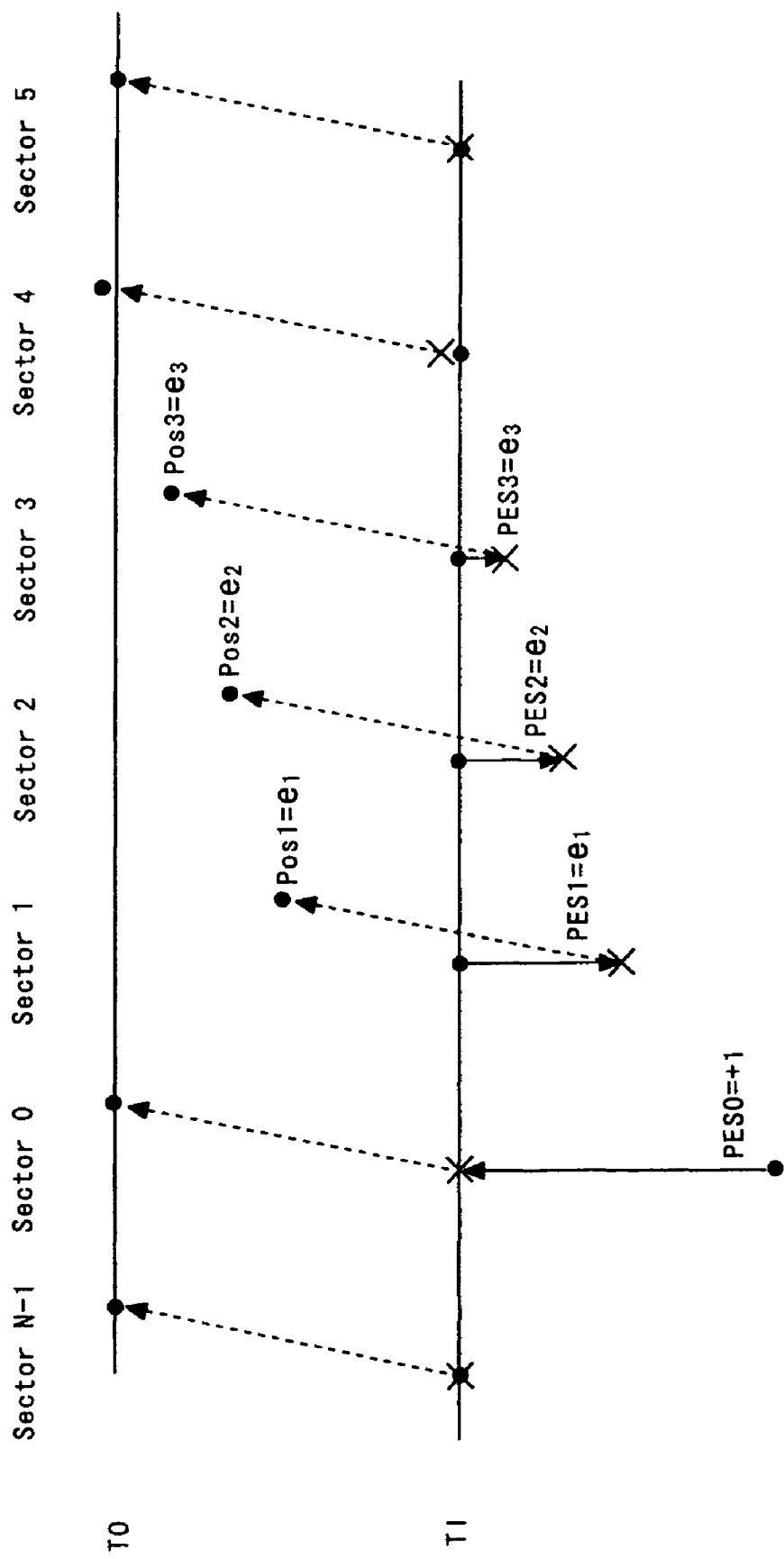
FIG. 13 is a diagram showing an example in which, when the track TO is written, among the respective sectors of the TI followed, only a servo pattern of Sector_0 deviates by "−1" and the other sectors are on a complete circle.

Like FIG. 9, FIG. 13 shows an example in which only a servo pattern of Sector_0 deviates by "−1". In FIG. 13, black circles indicate servo patterns of respective sectors and x indicates positions of the read element 121. This is equivalent to a case in which there is irregularity of an impulse form in one sector. Therefore, the track follow in the track TI is disturbed by the irregularity and the disturbance is directly reflected on position of the respective sectors of the track TO. Therefore, when the write element 122 writes the track TO, it is possible to accurately calculate a target correction value in following the track TO using PESs for position signals of the respective sectors read by the read element 122.

Here, when a PES value in writing TO while following the track TI is PES(TI), a deviation from a complete round is represented as follows using the matrix in (Equation 10).

$$|d\rangle = H|PES(TI)\rangle$$ (Equation 15)

As it is seen from FIG. 13, TO is written with the following error in the radial direction.

$$|PES(TI)> - |d> = (1-H)|PES(TI)>$$  (Equation 16)

Thus, this is used as a correction value in following TO.

Specifically, the target-position setting unit 232 stores a PES in writing each track in advance and corrects a target position using the PES stored when the track is followed. The PES in this case is a PES corresponding to a corrected target value obtained by correcting a target initial value. In the above example, when the track TO is followed, a propagation error in the radial direction is controlled by correcting a positioning target value using the PES stored in advance in the writing of the track TO. In other words, when the read head 121 follows the track TO to write the track TN anew, respective PESs of the track TI followed when the track TO was written in the past are stored and a target value for following the track TO is corrected using the PESs.

Specifically, the target-position setting unit 232 provides a table in the RAM 24 and registers PESs in writing the respective tracks in the table. The target-position setting unit 232 reads the PESs when the tracks are followed, calculates correction values using the PESs and a correction operator (elements of the correction matrix H) set in advance, and corrects a target value set in advance with the correction values.

A matrix 1-H used for this correction is represented as follows.

$$1 - H = \begin{bmatrix} 1-h_0 & -h_1 & -h_2 & & -h_{N-1} \\ -h_{N-1} & 1-h_0 & -h_1 & & -h_{N-2} \\ -h_{N-2} & -h_{N-1} & h_0 & & -h_{N-3} \\ & & & & \\ -h_1 & -h_2 & -h_3 & & 1-h_0 \end{bmatrix}$$  (Equation 17)

In a form of this matrix, like H in (Equation 10), N components in the first row appear in second and subsequent rows while cyclically shifting. Therefore, as described in paragraphs 106 to 114 above, correction values in the respective sectors are calculated as FIRs of tap weights obtained by, with the number N in the first row of (Equation 17) as a weighting coefficient, cyclically changing the weighting coefficient when a sector moves to a next sector and PESs at the time when patterns were written with the track following situation. Under conditions in which the servo operates normally, this FIR calculation has to be taken into account only for the sectors within the appropriate range before and after a sector of attention for which a correction value is calculated. The FIRs may be regarded as 0 when the FIRs exceed an appropriate range.

Figure 14:
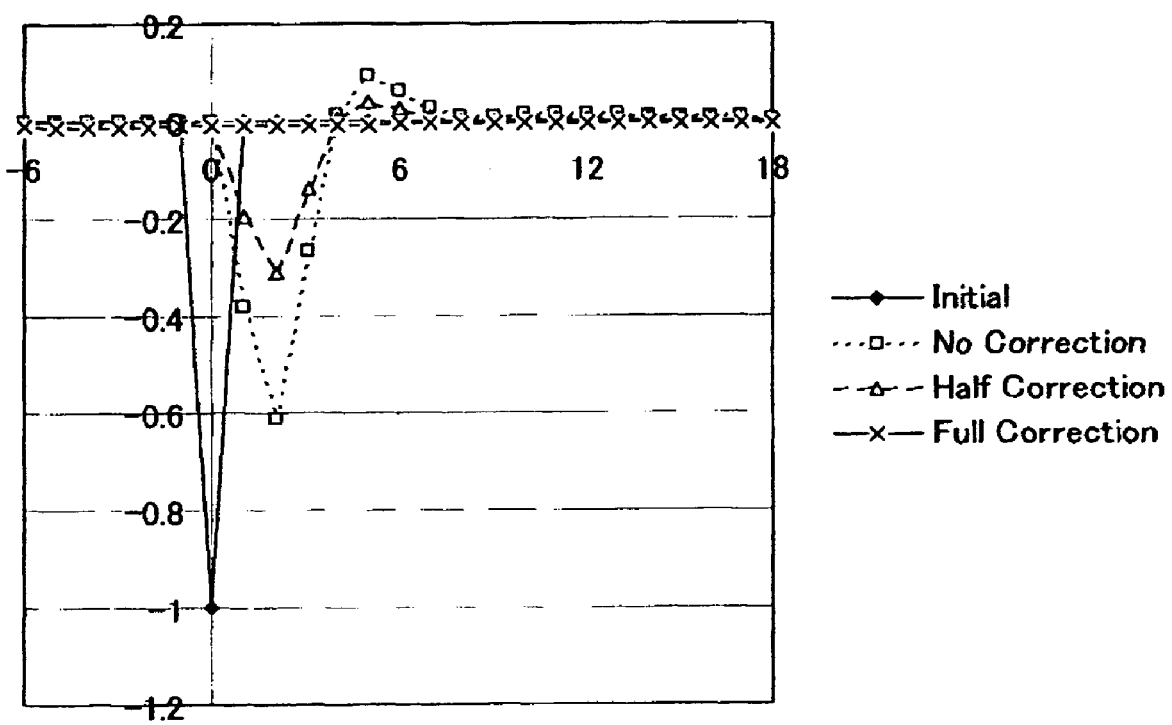
FIG. 14 is a diagram showing a simulation result in the case in which an impulse is inputted to one sector 0 in a system with 4200 RPM and 168 sectors/track.

In the following explanation, a simulation result of a servo system according to an embodiment for actually measuring a PES of the target track will be explained. FIG. 14 shows a simulation result in the case in which an impulse is inputted to one sector 0 in a system with 4200 RPM and 168 sectors/track. The abscissa indicates a PES from the ideal position and the ordinate indicates sectors. Respective lines are: a response in the case in which impulse input and the correction processing are not performed, a response by correction in the case in which a deviation d_i from an ideal position is multiplied by a coefficient 0.5, and a response in the case in which the response is directly corrected by the deviation d_i from the ideal position. It is seen that, by performing the correction, a PES as an impulse response immediately converges to an ideal value.

Figure 15A:
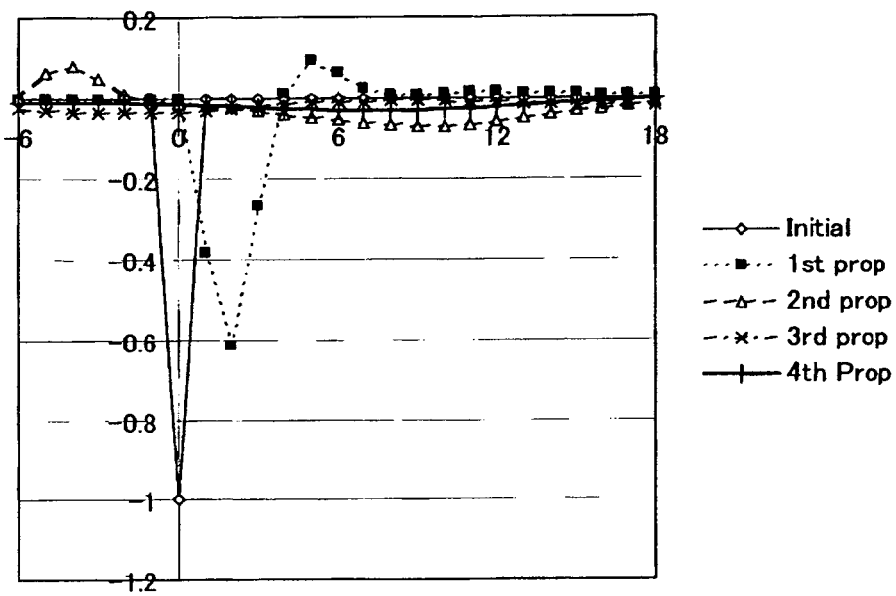
FIGS. 15(a) and 15(b) are diagrams showing a simulation result of a servo system according to an embodiment for correcting, using PESs at the time when a track is written, target values of respective sectors in the track.
Figure 15B:
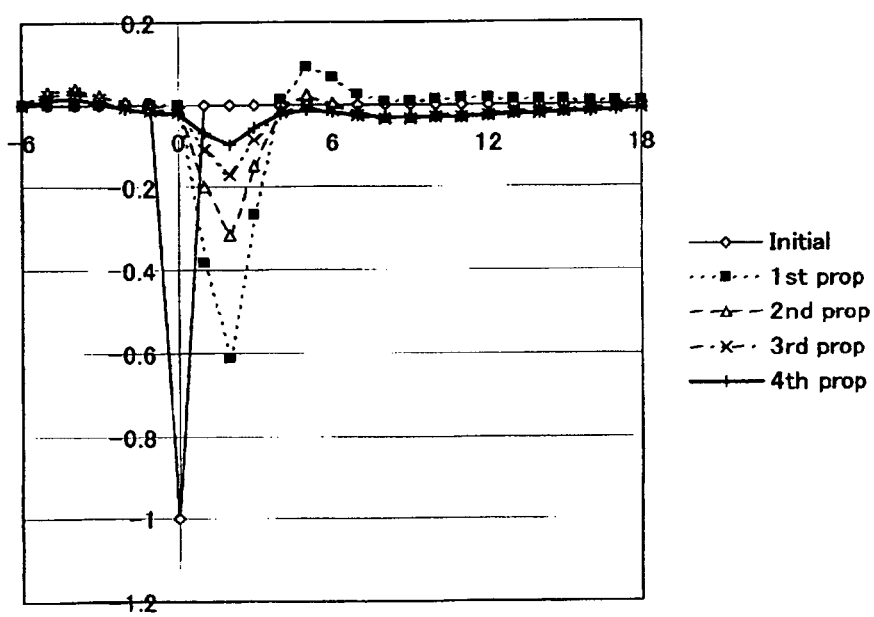

Simulation results of a servo system according to an embodiment for correcting, using a PES at the time of writing of the track, target values of respective sectors in the track are shown in FIGS. 15. FIG. 15(*a*) shows a simulation result in the case in which correction is performed with the coefficient α set to 1. FIG. 15(*b*) shows a simulation result in the case in which correction is performed with the coefficient α set to 0.5. As an initial state, a state in which the sector 0 shifts by −1 (see FIG. 13) is assumed.

When this track (TI in FIG. 13) is followed and writing is performed, a track (TO in FIG. 13) is written in a position with a certain amount of position error as 1st prop. When, while the correction is performed, this track TO is followed and a new track is written, the amount of error is indicated by 2nd prop, which is closer to an ideal value 0. When this is continued, an error is decreased step by step. As shown in FIG. 15(*b*), when the coefficient α is 0.5, although the effect of the suppression of error propagation is reduced, an error still converges to ideal values 0.

The invention has been explained with the preferred embodiments as examples. However, the invention is not limited to the above embodiments. Those skilled in the art are capable of easily modifying, adding, and altering the respective elements of the embodiments within the scope of the invention. In the examples described above, a servo pattern is written using the control circuit of the HDD. However, the present invention is also applicable when a servo pattern is written by controlling the mechanical structure of the HDD using a control device dedicated to servo write.

It is possible to apply the invention not only to the magnetic disk device but also to other types of disks. Although the invention is particularly useful for writing of a servo pattern, it is possible to apply the invention to writing of other patterns or control in following a track with a read element. Although a target value is determined with a complete round as an ideal position in the respective examples described above, it is also possible to set track shapes other than the complete round as targets.

What is claimed is:

1. A method of writing tracks including patterns of plural sectors on a rotating disk using a head having a read element and a write element in different radial direction positions, the method comprising:

correcting target values of the respective sectors by calculating corrected target values using position error signal values corresponding to the respective sectors included in the tracks followed by the read element and a correction operator obtained from an impulse response of a servo system that performs positioning control for the read element; and writing, in a state in which the head is positioned to bring position signal values of the respective sectors read by the read element closer to the corrected target values of the sectors, a new track with the write element in two or less rotations of the rotating disk.

2. A method according to claim 1, wherein the position error signal values corresponding to the respective sectors are position error signal values measured by reading out the respective sectors with the read element.

3. A method according to claim 1, wherein the position error signal values at the writing of the respective sectors are used as position error signal values corresponding to the respective sectors.

4. A method according to claim 1, wherein the correction operator is derived from an inverse matrix of a matrix for specifying a relation between deviations from ideal positions of respective sectors included in one track and a position error signal value in a state in which the track is followed.

5. A method according to claim 4, wherein the matrix in this case is represented as follows:

$$\begin{bmatrix} 1 & e\_N-1 & e\_N-2 & & e\_2 & e\_1 \\ e\_1 & 1 & e\_N-1 & & e\_3 & e\_2 \\ e\_2 & e\_1 & 1 & & e\_4 & e\_3 \\ & & & & & \\ e\_N-3 & e\_N-4 & e\_N-5 & & e\_N-1 & e\_N-2 \\ e\_N-2 & e\_N-3 & e\_N-4 & & 1 & e\_N-1 \\ e\_N-1 & e\_N-2 & e\_N-3 & & e\_1 & 1 \end{bmatrix}$$

where N is a number of sectors read by the read element and e_k is a position error value k sectors ahead in the case in which impulse is inputted to a specific sector.

6. A method according to claim 1, wherein the correction operator is calculated considering that the impulse response of the servo system is 0 after a predetermined number of sectors passed by from the application of the impulse.

7. A method according to claim 1, wherein
correction operators corresponding to the respective sectors are composed of elements in a number equal to or smaller than a number of all sectors read by the read element while the disk makes one rotation, and
correction values of the target values of the respective sectors are calculated using a multiply-and-sum operation of a position error value corresponding to each of continuous sectors including the sector to be corrected and sectors before and after the sector and the respective elements of the correction operator.

8. A method according to claim 1, wherein
the calculation of the corrected target values with the track written anew as a reference and the writing of a new track are repeated to advance writing of patterns on the rotating disk, and
in a course of advancing writing of the patterns, the impulse response of the servo system is specified by measurement to perform update of the correction operator.

9. A method of reading out patterns of plural sectors written on a rotating disk with a read element and performing track following of the read element with a servo system, the method comprising:
correcting initially set target values of the respective sectors by calculating corrected target values using position error signal values corresponding to the respective sectors included in the tracks followed by the read element and a correction operator determined in accordance with an impulse response of the servo system; and
subjecting the read element to positioning control to bring position signal values of the respective sectors read by the read element closer to the corrected target values of the respective sectors within two or less rotations of the rotating disk.

10. A method according to claim 9, wherein
position error signal values of the respective sectors are measured by the read element, and
the measured position error signal values of the respective sectors are used as position error signal values corresponding to the respective sectors.

11. A method according to claim 9, wherein position error signal values at the writing of the respective sectors are used as position error signal values corresponding to the respective sectors.

12. A method according to claim 9, wherein the correction operator is derived from an inverse matrix of a matrix for specifying a relation between deviations from ideal positions of respective sectors included in one track and position error signal values in a state in which the track is followed.

13. A method according to claim 9, wherein
correction operators corresponding to the respective sectors are composed of elements in a number equal to or smaller than a number of all sectors read by the read element while the disk makes one rotation, and
correction values of the target values of the respective sectors are calculated using a multiply-and-sum operation of a position error value corresponding to each of continuous sectors including the sector to be corrected and sectors before and after the sector and the respective elements of the correction operator.

14. An apparatus that writes tracks including patterns of plural sectors in a rotating disk, the apparatus comprising:
a head having a read element and a write element in different positions in a radial direction of the disk; and
a controller that subjects the head to positioning control, wherein
the read element reads respective sectors included in tracks to be followed,
the controller corrects target values of the respective sectors using position error signal values corresponding to the respective sectors included in the tracks followed by the read element and a correction operator determined in accordance with an impulse response of a servo system that performs positioning control for the read element, and
the write element writes a new track in a state in which the head is positioned to bring position signal values of the respective sectors read by the read element closer to the corrected target values of the sectors within two or less rotations of the rotating disk.

15. An apparatus according to claim 14, wherein the correction operator is derived from an inverse matrix of a matrix for specifying a relation between deviations from ideal positions of respective sectors included in one track and position error signal values.

16. An apparatus according to claim 14, wherein correction values of the target values of the respective sectors are calculated using a multiply-and-sum operation of a position error value corresponding to each of continuous sectors including the sector to be corrected and sectors before and after the sector and the respective elements of the correction operator.

* * * * *